US010235688B2

(12) United States Patent
Beatty et al.

(10) Patent No.: US 10,235,688 B2
(45) Date of Patent: Mar. 19, 2019

(54) WEB AND MOBILE DEVICE ADVERTISING

(75) Inventors: John D. Beatty, Redwood City, CA (US); Leonard R. Speiser, Menlo Park, CA (US); Michael L. Speiser, Los Altos, CA (US)

(73) Assignee: FIRST DATA CORPORATION, Greenwood Village, CO (US)

(*) Notice: Subject to any disclaimer, the term of this patent is extended or adjusted under 35 U.S.C. 154(b) by 1043 days.

(21) Appl. No.: 13/244,605

(22) Filed: Sep. 25, 2011

(65) Prior Publication Data

US 2012/0166267 A1    Jun. 28, 2012

Related U.S. Application Data

(60) Provisional application No. 61/427,166, filed on Dec. 24, 2010.

(51) Int. Cl.
*G06Q 30/02* (2012.01)

(52) U.S. Cl.
CPC ..... *G06Q 30/0219* (2013.01); *G06Q 30/0247* (2013.01)

(58) Field of Classification Search
CPC ............... G06Q 30/02; G06Q 30/0277; G06Q 30/0241; G06Q 30/0273
See application file for complete search history.

(56) References Cited

U.S. PATENT DOCUMENTS

| | | | |
|---|---|---|---|
| 6,269,343 B1 | 7/2001 | Pallakoff | |
| 6,324,519 B1 * | 11/2001 | Eldering | 705/14.66 |
| 7,840,224 B2 | 11/2010 | Vengroff et al. | |
| 8,082,174 B1 * | 12/2011 | Kamangar et al. | 705/14.1 |
| 8,311,885 B2 † | 11/2012 | Kennedy | |
| 2002/0099607 A1 * | 7/2002 | Sosa et al. | 705/14 |
| 2002/0111847 A1 * | 8/2002 | Smith, II | G06Q 30/02 705/7.31 |
| 2003/0033190 A1 * | 2/2003 | Shan et al. | 705/10 |

(Continued)

OTHER PUBLICATIONS

Utpal M. Dholakia, "How Effective Are Groupon Promotions for Businesses?" Sep. 28, 2010, 17 pages.

*Primary Examiner* — Vincent M Cao
(74) *Attorney, Agent, or Firm* — Eversheds Sutherland (US) LLP

(57) ABSTRACT

Techniques and systems for selecting advertisements for dissemination over a network are disclosed. In one embodiment, an advertisement service stores information indicative of offers from merchants, including information indicating an amount of revenue that the offering merchant would be willing to share with the advertisement service if a consumer consummates a transaction with the merchant based on the good or service advertised in the offer. The service computes predicted conversion rates for these offers, and uses the predicted conversion rates and the revenue sharing information to select an advertisement for dissemination according to which advertisement is expected to generate the greatest amount of revenue for the advertisement service. The predicted conversion rate can be based on various features, including physical location of the consumer, the consumer's preferences on a third-party information sharing service, amount of discount reflected in the offer, the customer service rating of the merchant, etc.

18 Claims, 42 Drawing Sheets

(56) References Cited

U.S. PATENT DOCUMENTS

| | | | |
|---|---|---|---|
| 2006/0089880 A1* | 4/2006 | Merriman et al. | 705/14 |
| 2007/0027743 A1* | 2/2007 | Carson et al. | 705/10 |
| 2007/0179856 A1* | 8/2007 | O'Kelley | 705/14 |
| 2007/0214057 A1* | 9/2007 | Lee et al. | 705/26 |
| 2007/0239527 A1* | 10/2007 | Nazer et al. | 705/14 |
| 2007/0288312 A1† | 12/2007 | Wang | |
| 2008/0004962 A1* | 1/2008 | Muthukrishnan | G06Q 30/0275 705/14.71 |
| 2008/0010120 A1* | 1/2008 | Chung | G06Q 30/02 705/26.1 |
| 2008/0065486 A1* | 3/2008 | Vincent et al. | 705/14 |
| 2008/0154705 A1* | 6/2008 | Gounares et al. | 705/10 |
| 2008/0167943 A1* | 7/2008 | O'Neil et al. | 705/14 |
| 2008/0313037 A1* | 12/2008 | Root et al. | 705/14 |
| 2009/0094093 A1* | 4/2009 | Phan | 705/10 |
| 2010/0211455 A1† | 8/2010 | Williams | |
| 2010/0223126 A1* | 9/2010 | Tung | G06Q 30/02 705/14.49 |
| 2010/0268584 A1* | 10/2010 | Pullur | G06Q 30/02 705/14.16 |
| 2010/0287044 A1 | 11/2010 | Mason | |
| 2010/0287103 A1 | 11/2010 | Mason | |
| 2011/0151892 A1 | 6/2011 | Vengroff et al. | |

\* cited by examiner
† cited by third party

WEB AND MOBILE DEVICE ADVERTISING

BACKGROUND

This specification relates to advertising, and, more particularly, to web and mobile device advertising.

Web and mobile device advertising (also referred to as "online" advertising) harnesses the power of the Internet to deliver marketing messages to customers. An example of an online advertisement is the "banner ad." A typical banner ad is an image that is embedded into a web page and contains a hyperlink such that, when clicked upon by a user visiting that web page, causes the user's browser to be redirected to a third-party web site. In some cases, the ad or image may convey an offer from a third party selling a product or service. "Pop-up" ads are similar, but are displayed in a separate browser window upon visiting a web page.

Another example of an online advertisement is the "interstitial" web page. When a user directs a browser to navigate to a desired page, an interstitial page displaying an advertisement is presented before the user is allowed to proceed to that desired page. Interstitial pages are shown to the user temporarily and cause the user to wait a predetermined amount of time before being redirected to the desired page. As a result, interstitial pages force the user to see a particular ad, presumably increasing the odds that the user will click on that ad and explore it further.

Such types of advertisements provide little or no indication of the destination to which the consumer is to be redirected upon clicking the ad. Such ads have been shown to cause "banner blindness," in which consumers simply ignore web or mobile device advertisements and/or seek tools that prevent their display altogether. For example, a user may install a software program or browser extension such as an ad blocker, a pop-up blocker, a content filter, or the like.

In addition to the shortcomings listed above, the current state of web and mobile device advertising has several other limitations recognized by the present inventors. For example, there are typically no analytical standards available to publishers (e.g., Internet websites or mobile service providers), advertisers (e.g., merchants), or consumers with which to measure the quality of their respective experiences relative to an advertisement. Also, most advertisements often are not personalized, which means they may not be particularly relevant to the viewer.

These and other limitations and inefficiencies lead to low ad click rates for advertisers, low consumer satisfaction, and low revenue for publishers.

SUMMARY

An improved advertising or deal system is disclosed. In various embodiments, an advertising system is provided to consumers (who may sign up to receive personalized advertisements from the system), merchants (who may convey offers for products or services to the system for inclusion in advertisements), publishers (on whose sites the ads may be displayed in certain instances), and third parties (e.g., social media sites that store information that may be used to personalize ads presented to users of the advertising system). In some embodiments, consumers may specify ad preferences or allow the system to retrieve additional data (e.g., friend data) from third-party sites. Merchants may specify bids for ad placement by specifying an amount of revenue that will be shared with the advertising service for a completed transaction (creating a service ad distribution system from the merchant perspective). Publishers may specify rules regarding the type, frequency, etc. of ads presented through its site. In one embodiment, the ad system may enable users to share or recommend offers to others, whether or not those individuals are currently users of the ad system.

In some cases, systems and methods described herein eliminate or otherwise reduce the need for users to navigate away from a site currently being visited by the consumer (e.g., through an Internet or mobile service site) in order to obtain more information about an offer. Such results may be achieved, for example, by providing the advertisement and subsequent display panels within the web page or within a layer on top of the web page—in both cases without redirecting the user from the current page. In this manner, the advertising system causes display of ads in a manner that minimizes interruption to the user and more effectively provides and obtain information needed to complete a sale. In some embodiments, the entire transaction—from the initial presentation of an offer through the completion of the transaction—may be performed without redirecting the user away from his or her current page.

In various embodiments, the advertising system permits merchants to bid on the dissemination of advertisements by the system. In one implementation, the advertising system permits merchants to submit deals that specify an amount of revenue the merchant is willing to pay to the advertising system (or let the advertising system keep) if a deal is consummated. In certain embodiments, the advertising system selects an advertisement for a particular user and context (e.g., location, time, etc.) that has the highest expected revenue for the system. This selection may be performed, for example, by computing a "conversion rate" (likelihood of a consummated transaction) for a user and a context for each current offer, and then multiplying an offer's conversion rate by the merchant's bid for that offer to determine the expected revenue to the advertising system. The offers may then be ranked by expected revenue, with the offer with the highest expected revenue ranked first in some implementations. In some embodiments, not all offers are eligible to be ranked—only those offers above a minimum conversion rate are ranked. Further, in some cases, the winning bid may be reduced based on an amount of another bid or bids (e.g., the second-place bid), in order to keep the winning merchant from overbidding.

Calculation of predicted conversion rates may be performed differently in various embodiments. In an embodiment, a plurality of attribute scores (e.g., merchant category type, merchant distance, merchant customer service rating, day of the week, friend information) may be used to generate a composite score. Certain attribute scores may be deemed more important than others in some situations, and thus weighted accordingly. Similarly, the values for a particular attribute score may be non-linear (e.g., a merchant distance of 0.3 miles has an attribute score of +15, while a merchant distance of 2 miles has an attribute score of +3). Certain attribute scores for a particular user may be based on information related to other users (e.g., information from a social media site). Additionally, the computation of predicted conversion rates may be dynamic—that is, the attribute scores for a particular user and context may evolve as the advertising system acquires more historical purchase decision data (e.g., purchase/no purchase decisions by users). Future ad selection for a particular user and context may be influenced not only by purchase decisions of that user, but also by other users of the system, whether or not they are related to that user in some way.

In an embodiment, the advertising system may allow merchants to specify "decaying" pricing rules to the system. Such rules may be useful, for example, for time-sensitive events (e.g., sporting events, performances, seatings at a restaurant, etc.). For example, a sample rule might specify an offer of $110 for 2 tickets to a sporting event 8 hours before the event, $75 at 4 hours prior to the event, $50 at 2 hours, $25 at 1 hour, etc. Accordingly, when the advertising system is selecting advertisements for dissemination, these rules may be used to quote an appropriate price based on the time remaining before the event. In this manner, the advertising system may give merchants the flexibility to receive some return on assets whose value would otherwise reach zero.

In an embodiment, the advertising system uses data regarding one or more users to model the behavior of another user, and thus rank ads for presentation to the other user accordingly. For example, the advertising system may obtain data relating to a first user of the system (e.g., from a social media site or information sharing service to which the first user belongs). This data may indicate one or more "friends" or "connections" of the first user or individuals/entities "followed" by the first user. If information about these related individuals/entities (e.g., preferences, purchase history, etc.) is available to the advertising system, this set of data may be used to predict a likelihood that the first user will consummate a transaction based on a given ad. Thus, if five of the first user's friends have expressed a preference for a particular merchant or have made purchases from that merchant, the advertising system may generate a prediction indicating an increased likelihood that the first user will consummate a transaction based on an ad from that merchant. Such data may also be based on a physical location of a related user. Thus, if a second user indicated as a "friend" of the first user in the context of a social media site has indicated that he or she is "checked in" to a particular merchant (e.g., is at a particular restaurant), the advertising system may be more likely to display an ad to the first user for the same merchant (a time-sensitive ad, in one instance).

In an embodiment, the advertising system enables verification of transactions that are consummated offline. In an implementation, upon a user requesting to purchase a product or service corresponding to an advertisement of the system, the system may generate two codes. The first code identifies the transaction and is conveyed to the user and the merchant, while the second code is provided to the user but not the merchant. The user provides the second code to the merchant upon redemption, preventing the merchant from seeking revenue from the advertising system for a transaction that has not yet been redeemed. In certain embodiments, the use of the second code is not needed for well-known merchants or merchants who have established a track record through a redemption history maintained by the advertising system. The system may be able to shift the applicability of this verification system to a particular merchant dynamically in some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. The headings used herein are for organizational purposes only and are not meant to be used to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION OF EMBODIMENTS

Introduction

This specification first discloses exemplary elements of an advertising ("ad") system. The ad system may include, in various embodiments, one or more server computer systems, client systems, the Internet, a mobile network, etc. The specification then discloses various systems, techniques, and computer-readable media that may be implemented in such an ad network. For sake of organization, certain portions of the specification contain headings such as "consumer's experience," "merchant's experience," and "publisher's experience." These headings are not, however, intended to limit the specification in any way. For example, there may be techniques described under the "merchant's experience" section that are applicable to publishers and vice versa. Similarly, there may be techniques (e.g., "verification of online transactions consummated offline") that are included under a particular heading (e.g., "consumers' experience") despite involving various entities (e.g., ad network, consumer, merchant and/or publisher), each entity performing its own functions. Finally, the specification describes a computer system and computer readable storage medium that may be used to implement various embodiments described herein.

An Exemplary Advertising System

Figure 1:
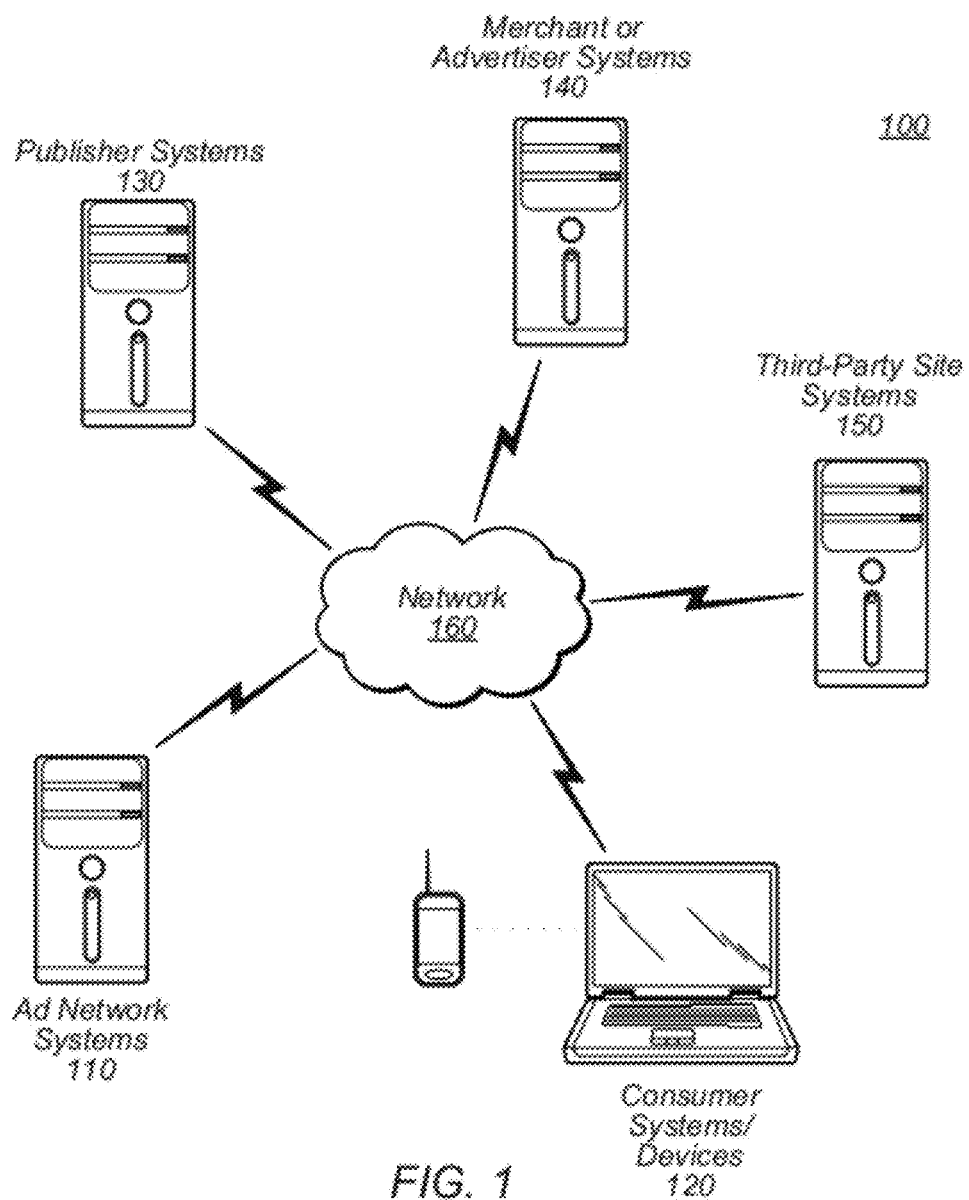
FIG. 1 is a block diagram of an advertising network according to some embodiments.

Turning to FIG. 1, a block diagram of one embodiment of an advertising system 100 is depicted. As illustrated, ad server 110 (which may also be referred to as a "deal system") is configured to communicate over computer network 160 (e.g., the Internet) with one or more consumer systems or devices 120, one or more publisher systems 130, one or more merchant or advertiser systems 140, and/or one or more third-party site systems 150 (e.g., a server of a social network or other information sharing service). Consumer systems/devices ("consumer systems") 120 may be any suitable network-enabled devices, including televisions, personal computers, tablet computers, smart phones, personal digital assistants (PDAs), etc. Typically, consumer device 120 is configured to operate a web browser, mobile browser, or the like. Publisher systems 130, advertiser system 140 and third-party sites systems 150 may include one or more servers or computer systems. In some embodiments, each of systems 110-150 may be implemented, at least in part, as one or more instances of computing system 4200 depicted in FIG. 42. As will be discussed in more detail below, system 100 may be configured to implement certain methods and techniques that enable publisher systems 130 to display web or mobile advertising from advertiser systems 140 to consumer systems 120. As used herein, a "web advertisement" is an advertisement displayed to a consumer via a website (e.g., via the World Wide Web); a "mobile advertisement" or "mobile device advertisement" is an advertisement that is displayed to a consumer on a mobile device. In many situations, an advertisement may be both a "web advertisement" and a "mobile device advertisement."

For example, a merchant or advertiser associated with a system 140 may desire to make one or more of its products and/or services available to one or more consumers associated with systems 120. To do so, an advertiser may wish to have a web or mobile device advertisement displayed to the one or more consumers that visit a site associated with publisher system 130 (e.g., Internet site, mobile device site, etc.). In some instances, the advertiser and the publisher may be distinct entities. For example, advertiser system 140 may be a merchant system (e.g., an e-commerce server), and publisher system 130 may be a content provider's server (e.g., a news website, etc.). In other instances, however, an advertiser and a publisher may be the same entity (e.g., the merchant wishes to advertise products or servers on its own website).

Ad server 110 may perform various operations that enable a new user to sign up (register) with ad system 100 to receive offers and consummate transactions. Ad server 110 may also enable existing users to continue receiving such offers and to share offers with friends. For instance, ad server 110 may communicate with a system of a third-party social network (i.e., third-party site systems 150) to obtain user profile information and/or information identifying friends of a user of ad server 110 (e.g., an individual who has registered with server 110). Ad server 110 may also allow an advertiser to register with system 100 to create offers and make sales through network 160. For example, ad server 110 may provide a dashboard or other user interface through which an advertiser may evaluate past, present, and future offers or ad campaigns. The dashboard may also include functionality that allows the merchant to collect analytical data regarding its activities in the network (e.g., number of customers acquired per campaign, total and average revenue, etc.). Ad server 110 may further allow a publisher to register with ad network 100 to present, on its site, offers from a participating advertiser. For instance, server 110 may allow a publisher to select certain aspects of the presentation of an advertiser's offers; these selections may, in some cases, affect the manner in which a publisher receives revenues from displaying the ad.

Figure 2:
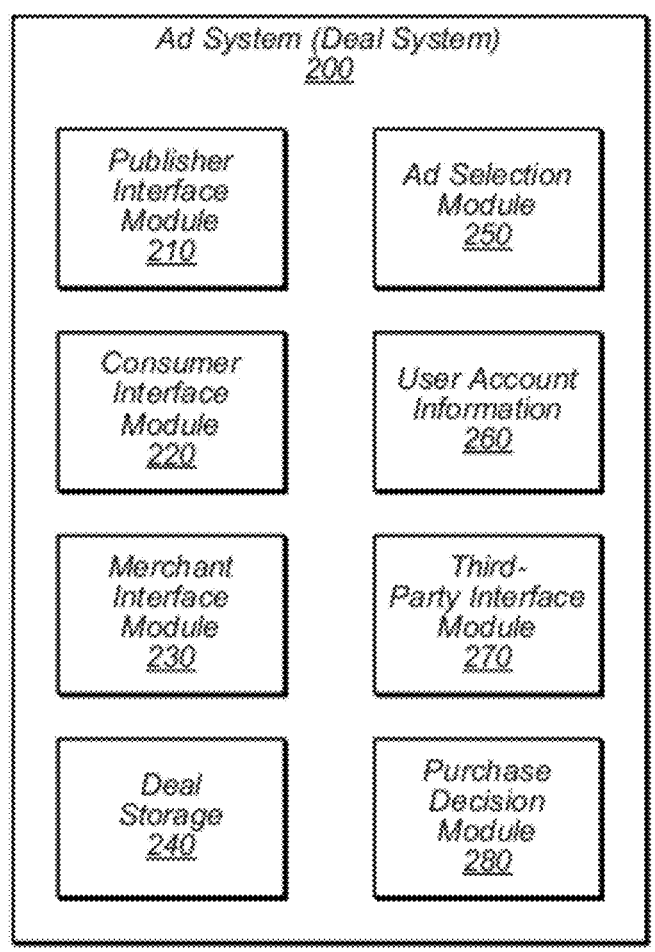
FIG. 2 is a block diagram of an advertising system according to some embodiments.

Referring to FIG. 2, a block diagram of advertising (ad) or deal system 200 is depicted according to some embodiments. In various embodiments, ad or deal system 200 may be executed or implemented by ad server 110 of FIG. 1, and includes a plurality of modules 210-280. These modules may be variously implemented in hardware or software as desired. As illustrated, ad system 200 includes a number of modules, including publisher interface module 210, consumer interface module 220, and merchant interface module 230. In one embodiment, publisher interface module 210 may serve as an interface between ad system 200 and publishers, consumer interface module 220 may serve as an interface between ad system 200 and consumers, and merchant interface module 230 may serve as an interface between ad system 200 and merchants or advertisers, including as an interface for receiving ad bids, as described below. Thus, as one example, publisher interface module 210 may include program instructions stored on a tangible (i.e., non-transitory) computer-readable medium that are executable to permit the exchange of information between publishers and system 200. To implement such interfaces, ad system 200 may include one or more application program interfaces (APIs) that facilitate the exchange of information among the various entities. For example, publisher interface module 210 may implement a publishing API that allows publishers 130 to access and make use of the services and resources provided by ad system 200. Similarly, consumer interface module 220 and merchant interface module 230 may implement their own respective APIs.

Ad system 200 may further include deal storage module 240, ad selection module 250, user account information module 260, third party interface module 270, and purchase decision module 280. In one embodiment, deal storage module 240 stores, in a database or other data store, deal or offer information. For instance, deal storage module 240 may include a table structure or the like that stores, in a given record, deal description data (e.g., merchant, product price, etc. for a particular offer), as well as other information that allows ad system 200 to implement one or more techniques described below. Thus, if a merchant has conveyed to ad system 200 an offer to sell tickets to a particular sporting event at a particular price, for example, deal storage 240 may store a record or other entry with information describing that offer, including information indicating that an entry corresponds to a currently valid deal.

Other modules may utilize the information in deal storage 240 to perform certain operations. For example, ad selection module 250 may, in some embodiments, include program instructions executable to select one of a plurality of entries stored in 240. In some embodiments, deal storage 240 may store advertisements themselves; accordingly, selection of an entry in 240 is tantamount to selecting an advertisement. In other embodiments, deal storage 240 may simply include information indicative of a deal; in such embodiments, selection of an entry may be used to generate an advertisement. In some cases, ad selection module 250 may select an entry from deal storage 240 based on an algorithm that targets a particular user. Additionally or alternatively, ad selection module 250 may select an entry from deal storage 240 based on expected revenues and/or predicted conversion rates.

In some embodiments, ad selection module 250 may include one or more machine-learning algorithms for selecting ads based on purchase and/or non-purchase data. For example, in some cases a machine-learning algorithm may automatically learn to recognize complex purchase patterns and make intelligent decisions based on purchase data received from purchase decision module 280. Instances of suitable machine-learning algorithms may include decision trees, artificial neural networks, Bayesian networks, etc. Given a particularly transaction history, for example, such an algorithm may determine the probabilistic relationships between past and future purchase patterns. Additionally or alternative, a machine-learning algorithm may determine probabilities of future transactions based on non-purchase data or other user characteristics (e.g., favorite books, activities, age, gender, etc.) and/or publisher characteristics (e.g., a sports website, a news website, a technology website, etc.). Such non-purchase data may be obtained, for example, from one or more of modules 210-230, 260, and/or 270, as described in more detail below.

In one embodiment, user account information module 260 may include a database or other data store that is configured to store information of users of the ad system (e.g., registered users). In some instances, module 260 includes general account information, user preferences, friend connections, or the like. Module 260 may be utilized in an algorithm executed by selection module 250 in some embodiments— for example, to ensure that an advertisement selected for a given user comports with that user's express or implied preferences. Generally speaking, information stored in module 260 may be used by any suitable module with the advertising system of the present disclosure.

Third-party interface module 270 may serve as an interface to other computer systems that may include information relevant to system 200. For example, module 270 may be used to access information residing at a social media website or database; the accessed information may be used for a variety of purposes (e.g., to convey a deal to a user based on deals consummated by that user's friends, as specified by that user on a social media website). To this end, third-party interface module 270 may have its own API and/or may make use of another system's API.

Purchase decision module 280 may include program instructions or the like that are executable to process consummated ads. In some embodiments, purchase decision module 280 may detect whether a user has accepted or rejected a displayed ad. Purchase decision module 280 may also determine how far into a proposed transaction the user has navigated, and may identify which such transactions have ultimately been consummated. In some cases, purchase decision module 280 may further determine whether an item purchased through system 100 has been returned to a merchant, and also the reason for the return (if applicable). These various types of information may be used, in some cases, to update the one or more machine-learning algorithms of ad selection module 250.

Figure 3:
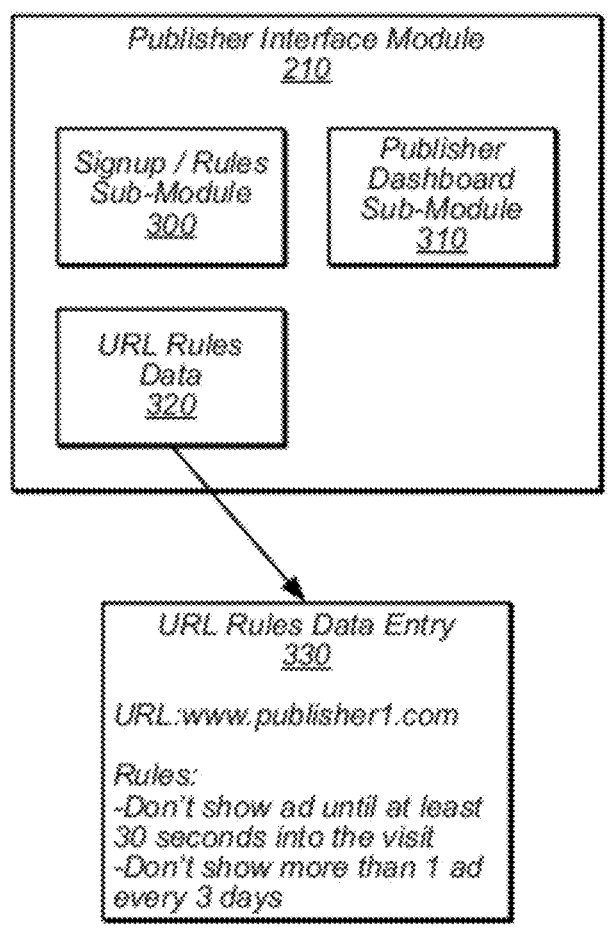
FIG. 3 is a block diagram of a publisher interface module according to some embodiments.

FIG. 3 is a block diagram of publisher interface module 210 according to some embodiments. In an embodiment, publisher interface module 210 may allow one or more publisher systems 130 to interact with ad system 200. As illustrated, publisher interface module 210 includes signup/ rules sub-module 300, publisher dashboard module 310, and Uniform Resource Locator (URL) rules data module 320. In some embodiments, signup/rules sub-module 300 includes program instructions executable to permit a publisher to sign up to participate in ad network 100 and to allow the publisher to set and/or edit rules for ad selection and/or display on its site(s). As such, sub-module 300 may enable a publisher to control one or more aspects of its participation in ad network 100. URL rules data module 320 is configured to store the publisher's ad display and/or selection rules such as, for example, URL rules data entry 330, which is discussed in more detail below.

Figure 35:
FIG. 35 is a screenshot of a panel displaying "offer previewing" functionality according to some embodiments.

Publisher dashboard sub-module 310 is configured to allow the publisher to view ad performance, current amount of revenue being shared, and other pertinent information, as illustrated in FIG. 35, for example. In some cases, publisher dashboard sub-module 310 may include active control components that may be embedded onto a webpage presented to a publisher upon the publisher's logging into ad system 200 via publisher interface module 210. In other cases, publisher dashboard sub-module 310 may interact with a standalone publisher application residing in publisher systems 130.

Figure 4:
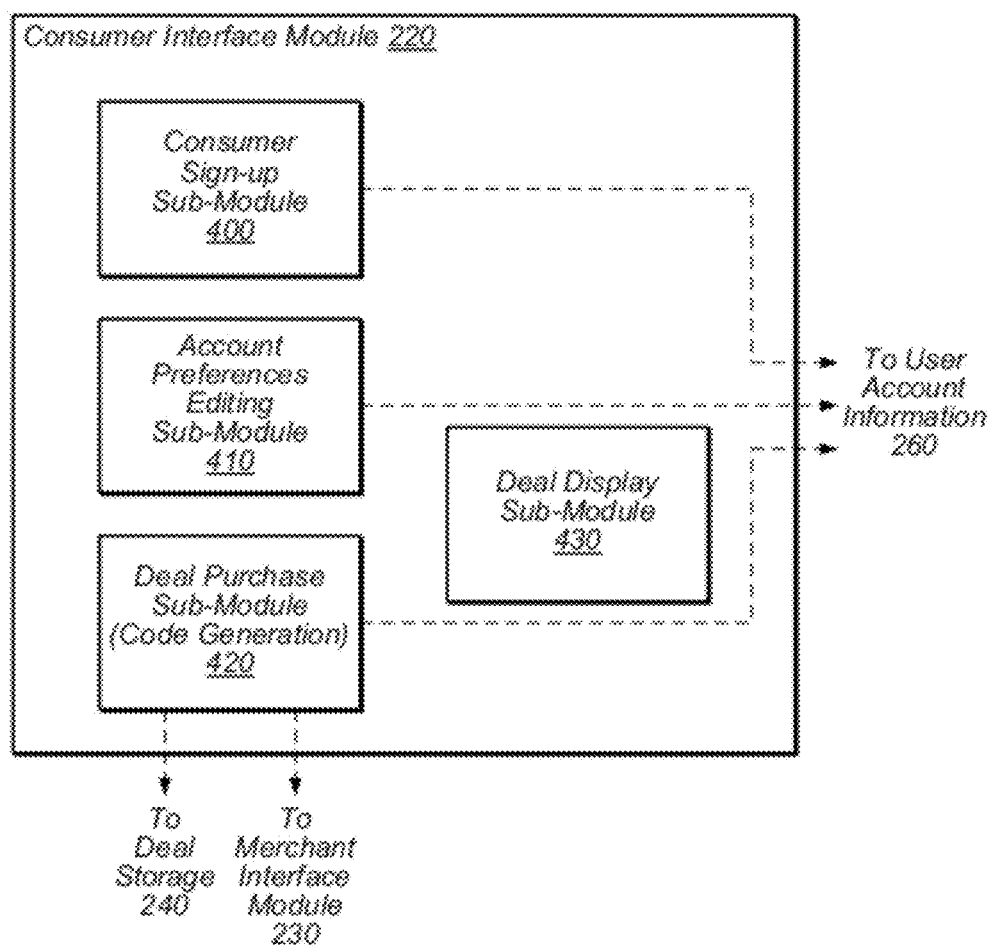
FIG. 4 is a block diagram of a consumer interface module according to some embodiments.

FIG. 4 is a block diagram of consumer interface module 220 according to some embodiments. Generally speaking, consumer interface module 220 allows one or more consumers 120 to interact with ad system 200. As illustrated, consumer interface module 220 includes consumer sign-up sub-module 400, account preferences editing sub-module 410, deal purchase sub-module 420, and deal display sub-module 430. In some embodiments, consumer sign-up sub-module 400 is configured to allow a consumer to sign up to participate in ad network 100. An illustrative method for allowing new users to sign up to receive ads is described in connection with FIG. 9, and another method for allowing return users to sign into ad network 100 is described in connection with FIG. 15. In some cases, consumer sign-up sub-module 400 may provide a currently unrecognized user an opportunity to sign on to network 100 (e.g., in the case of a return user) or sign up for new service (e.g., in the case of a new user) via an ad presented on a publisher's website. Additionally or alternatively, the user may visit a URL associated with ad server 200 to log on to network 100.

Account preferences editing sub-module 410 is configured to store information about the types or categories of ads that the consumer would like to see. Examples of categories include, but are not limited to, a type of product or service (e.g., sports tickets, books, electronics, etc.), an originator of the offer (e.g., from a particular retailer, etc.), and price (e.g., offers within a price range, etc.), among others. In addition, account preferences editing sub-module 410 is also configured to store information about the user's friends, preferences, and the like. Typically, account preferences editing sub-module 410 may receive this information from the user; although, in some cases, sub-module 410 may receive the information from third parties and/or may determine such information based on the user's previous interactions with ad network 100. After storing the user's initial preferences, account preferences editing sub-module 410 may allow the user to edit, update, or modify those preferences over time.

Deal display sub-module 430 is configured to cause the initial display of ads to the user, as well as subsequent panels with additional deal information that may ultimately allow the user to consummate a transaction. In some embodiments, deal display sub-module may include algorithms for assembling ads in the form of webpage components, and may configured to communicate those webpage components to publisher systems 130. These operations may take place while a user is browsing a publisher's website. In other embodiments, ads may be pre-assembled (e.g., prior to or independent from a user's visit to the publisher's website) and stored either at ad server 200 and/or a publisher system 130.

Deal purchase sub-module 420 is configured to allow the user to actually consummate transactions. As such, deal purchase sub-module 420 may include a payment gateway that allows payment processing or clearing (e.g., credit cards, debit cards, electronic checks, etc.). For example, deal purchase sub-module 420 may be configured to connect to a secure payment system (e.g., via Internet 160) or may include its own integrated point-of-sale platform. In addition, deal purchase sub-module 420 may also generate coupon codes as described below.

In operation, each of consumer sign-up sub-module 400, account preferences editing sub-module 410, and deal purchase sub-module 420 within consumer interface module 220 may provide respective output to user account information module 260 of ad system 200. Furthermore, deal purchase sub-module 420 may also provide information to deal storage module 240 and to merchant interface module 230. For example, deal purchase sub-module 420 may transmit information about a consummated deal (e.g., date, product, price, etc.) to deal storage module 240 as well as merchant interface module 230.

Figure 5:
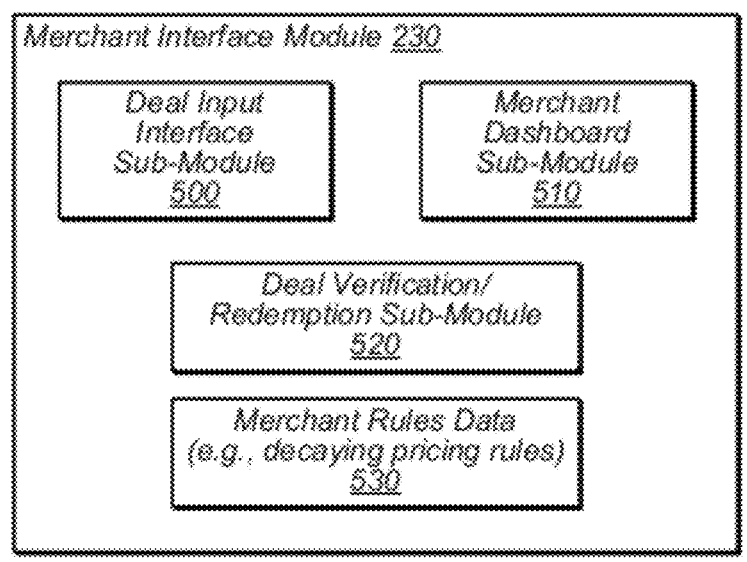
FIG. 5 is a block diagram of a merchant or advertiser interface module according to some embodiments.

FIG. 5 is a block diagram of merchant or advertiser interface module 230 according to some embodiments. In general, merchant interface module 230 allows one or more merchants or advertisers to interact with ad system 200. As shown, merchant interface module 230 includes deal input interface sub-module 500, merchant dashboard sub-module 510, deal verification/redemption sub-module 520, and merchant rules data module 530. For example, deal input interface sub-module 500 may be configured to receive merchant bids for ad placement in ad network 100. For example, a merchant may identify a desired ad placement option offered by ad system 200 and may bid a dollar amount for that option. Additionally or alternatively, the merchant may bid a percentage of sales revenue from consummated transactions that are originated from the displaying of the ad. In some cases, an ad placement option may include a minimum bid amount or percentage. Moreover, ad placement options may include other information such as a number of times and ad will be displayed, a publisher's website(s) (or type of website) where the ad will be displayed, a number of unique users to which the ad will be displayed, a type of user to which the ad will be displayed, etc.

Dashboard sub-module 510 may be similar to publisher dashboard sub-module 310 of FIG. 3 in that it may allow the merchant or advertiser to view ad performance and other related information. Deal verification/redemption sub-module 520 may be configured to verify that a consumer has prepaid for a product/service and for submitting a private coupon code received from the consumer at redemption, thus allowing the merchant to receive payment from the ad system. Merchant rules data module 530 may store ad placement rules created by the merchant. Such rules may include, for example, the decaying pricing rules described in more detail below.

Figure 6:
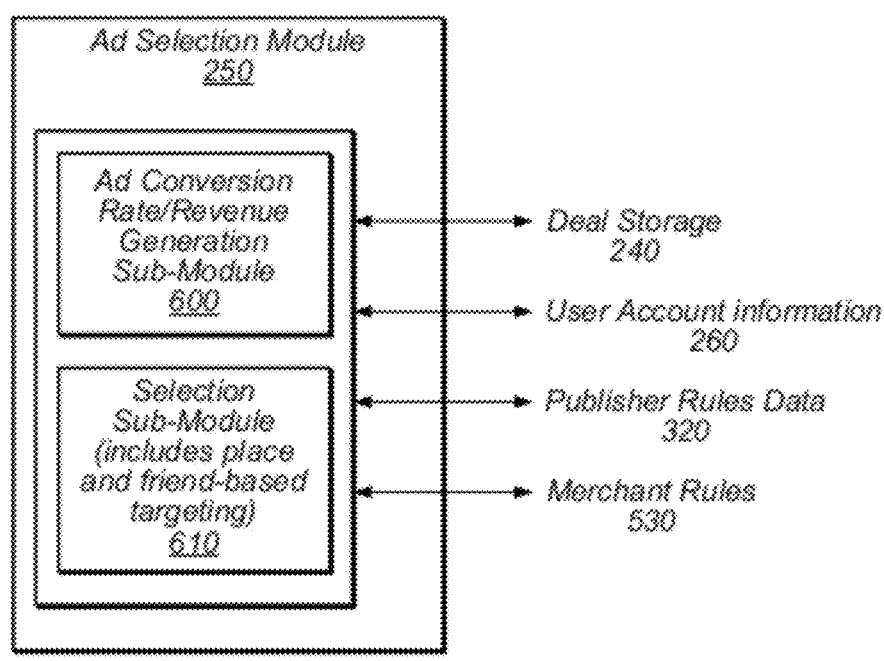
FIG. 6 is a block diagram of an ad selection module according to some embodiments.

FIG. 6 is a block diagram of ad selection module 250 according to some embodiments. As illustrated, ad selection module 250 includes ad conversion rate/revenue generation sub-module 600 and ad selection sub-module 610. For example, ad conversion rate/revenue generation sub-module 600 may be configured to compute a predicted conversion rate and ranking offers according to expected revenue as described in some embodiments below, including second price auction mechanisms. Meanwhile, ad selection submodule 610 may be configured to select an ad, for example, implementing machine-learning algorithms and techniques relating to place- and friend-based targeting and retargeting. As such, modules 600 and/or 610 may receive and/or provide information to deal storage module 240, user account information 260, publisher rules data module 320, and/or merchant rules module 530.

Figure 7:
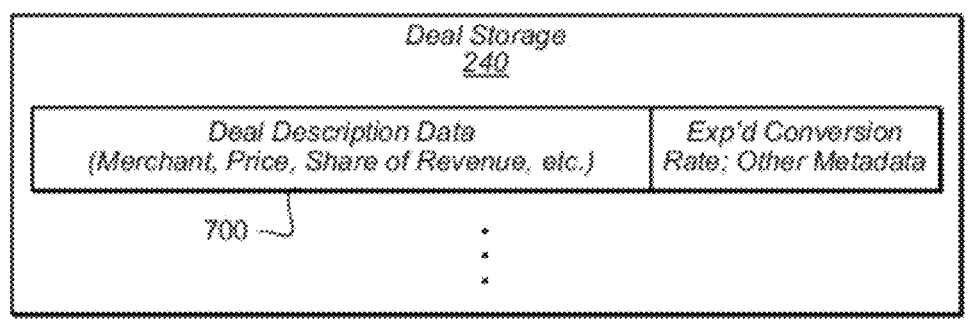
FIG. 7 is a block diagram of a deal storage module according to some embodiments.

FIG. 7 is a block diagram of deal storage module 240 according to some embodiments. As illustrated, deal storage module 240 may store deal information, for example, in table 700 to include deal description data. For instance, table 700 may be implemented in the form of a lookup table, an array, an associative array, linked list, hash table, or other suitable data structure. Examples of deal description data include, but are not limited to, a product or service's price, a share of a merchant's revenue (e.g., merchant indicates it will pay $10 to the ad system if a deal is consummated), as well as conversion rates and other purchase data or metadata.

Figure 8:
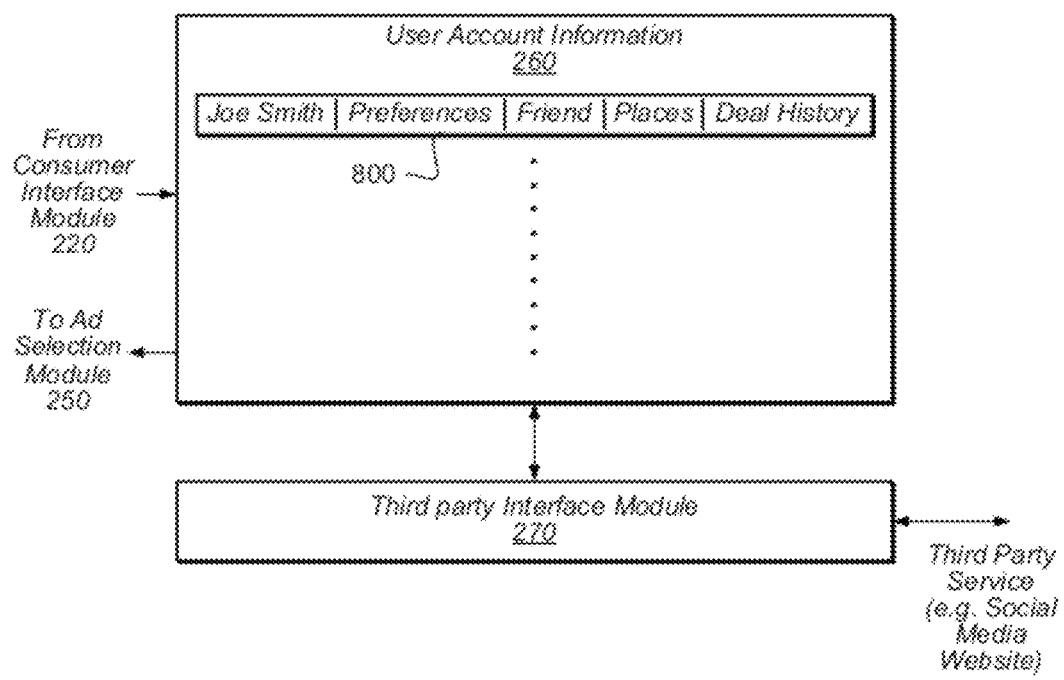
FIG. 8 is a block diagram of a user account and third party interface modules according to some embodiments.

FIG. 8 is a block diagram of user account information module 260 and third party interface module 270 according to some embodiments. As shown, user account information module 260 may receive information from consumer interface module 220 and store that information in table 800 or some other suitable data structure. For example, table 800 may include, but is not limited to, a consumer's name or identifier, preferences, friends or contacts, visited places or websites, deal history, etc. The information stored in table 800 may be provided to ad selection module 250 to aid the ad selection process. In addition, third party interface module 270 (e.g., social media site, etc.) may provide and/or receive information from user account information module 260.

In various embodiments, modules shown in FIGS. 2-8 may represent a set of software routines, logic functions, and/or data structures that are configured to perform specified operations. Although these modules are shown as distinct logical blocks, in other embodiments at least some of the functionality provided by these modules may be combined in to fewer blocks. Conversely, any given one of these modules 210-280 may be implemented such that its functionality is divided among a two or more logical blocks. Moreover, although shown with a particular configuration, in other embodiments these various modules and sub-modules may be rearranged in other suitable ways.

Consumers' Experience

Overview

In some embodiments, operation of ad server 110 may cause a user or consumer (e.g., user 120) visiting a publisher's web or mobile site (e.g., publisher 130) to be presented with an ad layer (referred to as the "toast," a small graphic that slides across the screen with an ad or message) originated by an advertiser or merchant (e.g., advertiser 140). Consumers may, in some instances, be asked to log into the ad network. Once signed into the network, offers or deals may be displayed on the consumer's web or mobile browser based on a series of personalization rules.

In some cases, information associated with a user declining an offer can be used for future targeting. Consider an offer may be to purchase a $50 gift card for $25 at merchant Y. Once the offer appears on the user's browser, the user may choose to click on "not interested" to make the offer go away, which may feed additional data back to ad server 110 for future targeting. In some cases, there may be more granular reasons for declining an offer (e.g., merchant Y is too far from my current location) that may better adjust future personalization.

If a user is interested in an offer, the user may click on the ad, thus causing a sequence of one or more new panels to appear over the publisher's web or mobile site. These panels may enable the user to learn more and ultimately consummate a transaction. In some embodiments, the transaction may be effected through ad server 110 in order to provide the user with an "escrow" that reduces risk between parties. Once a transaction is complete, the customer can redeem the product or service either online or offline based on the merchant's or advertiser's preferences. In some cases, as will be discussed in more detail below, the consumer may be given a unique code for the merchant to use to obtain payment from the ad system.

User Sign-Up/Log-In

Figure 9:
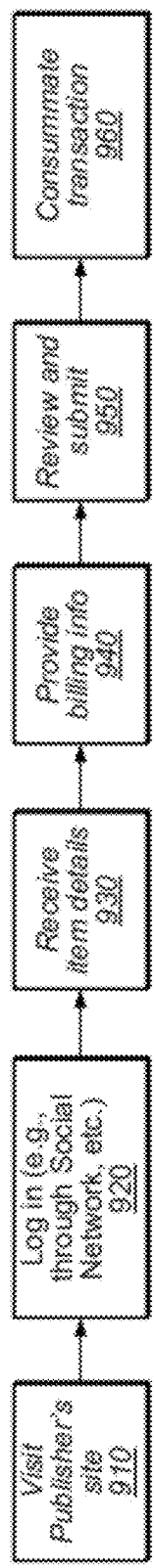
FIG. 9 is a flowchart of a method for signing up a new user or consumer into the ad network is shown according to some embodiments.

Turning now to FIG. 9, a flowchart of a method for signing up a new user or consumer into the ad system is shown according to some embodiments. This flowchart is shown from the perspective of the user; corresponding methods for other actors in the transactions are also contemplated. First, at 910, a user visits a publisher's web or mobile site (e.g., publisher 130).

At 920, a user logs in to the ad network. This functionality may be accomplished in a number of different ways. The user may log in to the ad network directly—for example by providing a username and/or a password, or some other identification information. In some embodiments, the log-in information may be for a third-party information sharing service (e.g., FACEBOOK, MYSPACE, LINKEDIN, etc.), and the user may indicate that they wish to use this third-party login information to authenticate to the ad network. The use of such information may improve targeting and retargeting of ads, as well as other subsequent operations.

Alternatively, an implicit sign-in operation may be performed. For example, a user may be signed into a service such as FACEBOOK, but not currently signed into ad server 110. When the user visits a publisher site running code supplied from the ad network system, the code may query an API of the third-party service, e.g., presenting an application identifier specifying the ad network. The third-party service may have a cookie or other information that provides an identifier of the user, which may in turn be used with the application identifier to provide return information (e.g., a FACEBOOK id) to ad server 110. Ad server 110 may then use the returned information to identify a user of the ad network, and subsequently target ads accordingly. In this manner, a user may effectively be logged in to ad server 110 without completing an explicit sign-in sequence. Ad server 110 thus may leverage a current sign-in for another service. Note that while it is possible to attempt an implicit sign-in at every visit to a publisher website within the ad network, this may be undesirable from a number of perspectives, including the extra traffic generated by such requests. Accordingly, the code at a publisher website may be executable to attempt to log in only some small percentage of the time. In some embodiments, this determination whether to attempt to log the user in may be made randomly; in other instances, this decision may be made based on certain specified criteria. Thus, in some embodiments of 920, the log in is not performed by the user.

At 930, the user may receive details about a deal being presented. For example, the user may receive an indication that a particular product or service is available for sale from a given merchant for a certain price. At 940, the user may provide billing or payment information. Upon having an opportunity to review the information entered and submitting it to ad server 110 at 950, the transaction may be consummated at 960.

Figure 10:
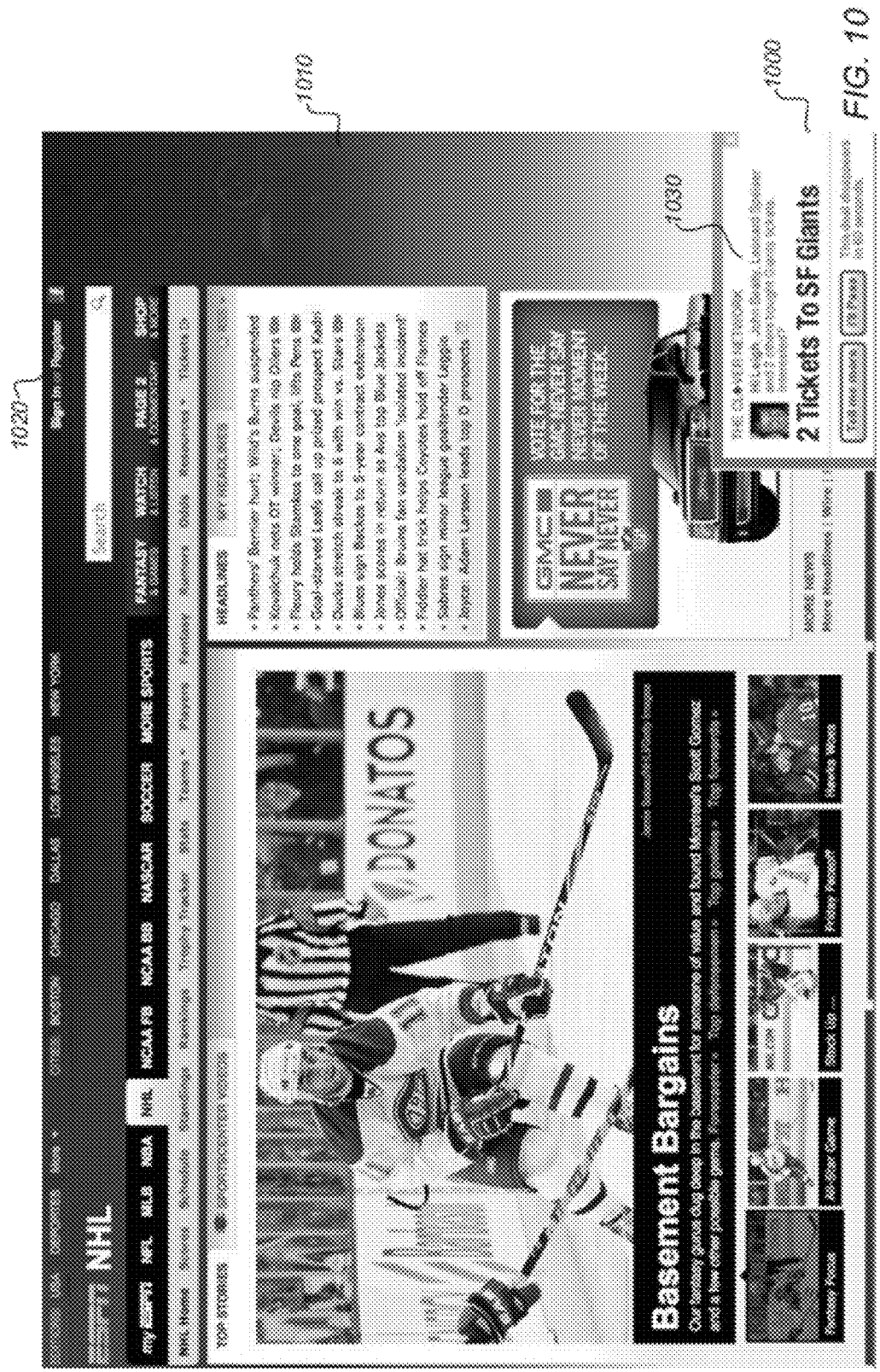
FIG. 10 is a screenshot of an initial offer display overlaid upon a publisher's website according to some embodiments.

In some cases, the user may be a new user with respect to ad network 100, and ad server 110 may not have any particular information about him or her; therefore the initial offer may be a generic ad. In other cases, however, ad server 110 may be able to identify some user-specific information through the user's interaction with the publisher's website (e.g., login information). An example of a screenshot of such "initial offer" display 1100 overlaid upon publisher's website 1010 is shown in FIG. 10. If the user is recognized, for example, because he or she has registered or signed into publisher's website 1010 through sign-in element 1020, the method may include displaying, along with the initial offer, a short narrative 1030 stating which of the user's friends has accepted the same or a similar offer.

Figure 11:
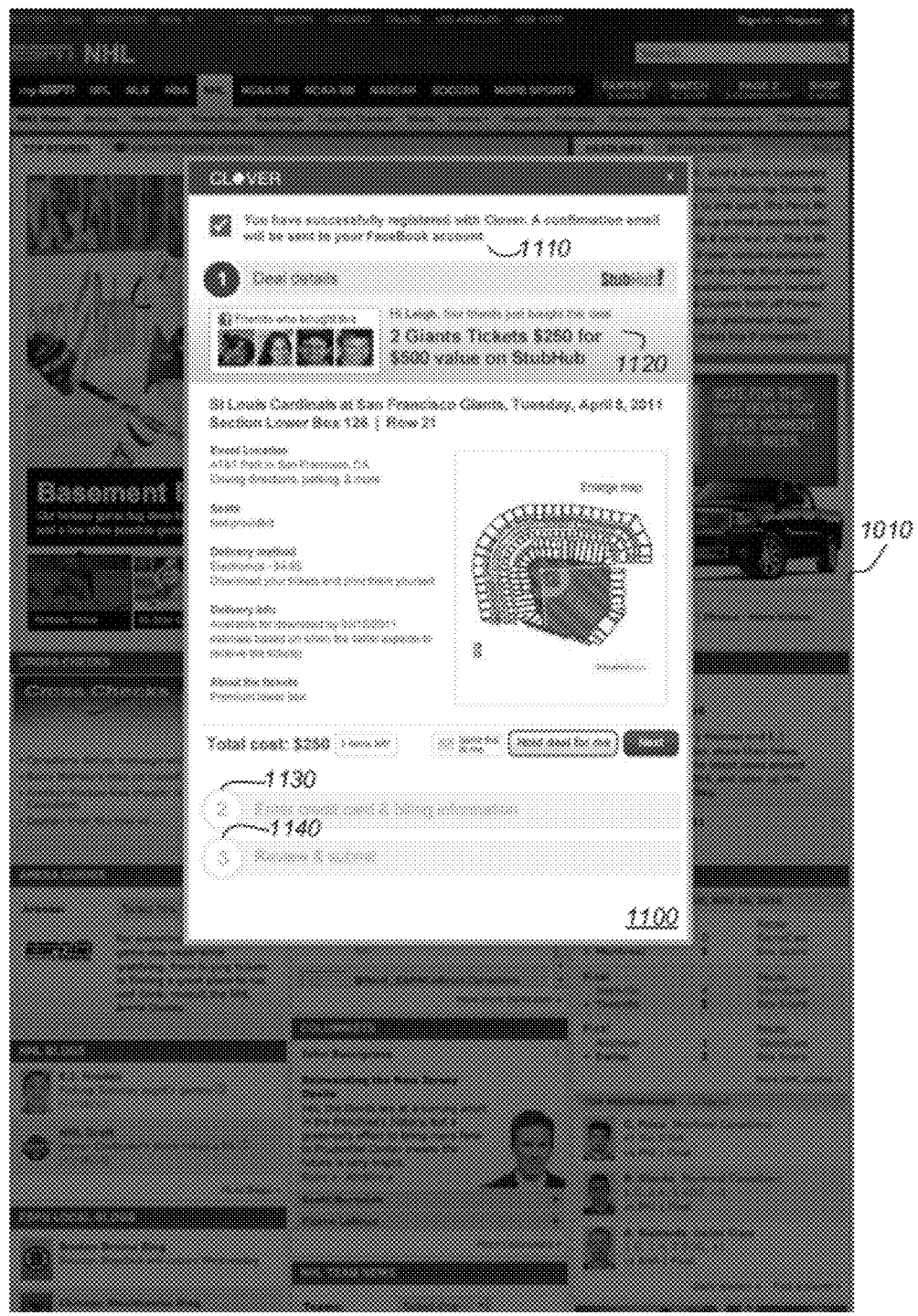
FIG. 11 is a screenshot of a detail offer display overlaid upon a publisher's website according to some embodiments.

As noted above, if the user opts to receive more information about the initial offer, at 930 a display may be overlaid upon publisher's website 1010 with details about the offer. An example of a screenshot of an "offer detail" 1200 display overlaid upon publisher's website 1010 is shown in FIG. 11. As illustrated, offer detail 1200 includes an indication 1120 that a new user has successfully registered with the ad network, and details about the particular offer under consideration 1130. Offer detail 1200 also indicates subsequent operations to be performed in 1140 and 1150, which in this case correspond to blocks 940 and 950 of FIG. 9, respectively.

Figure 12:
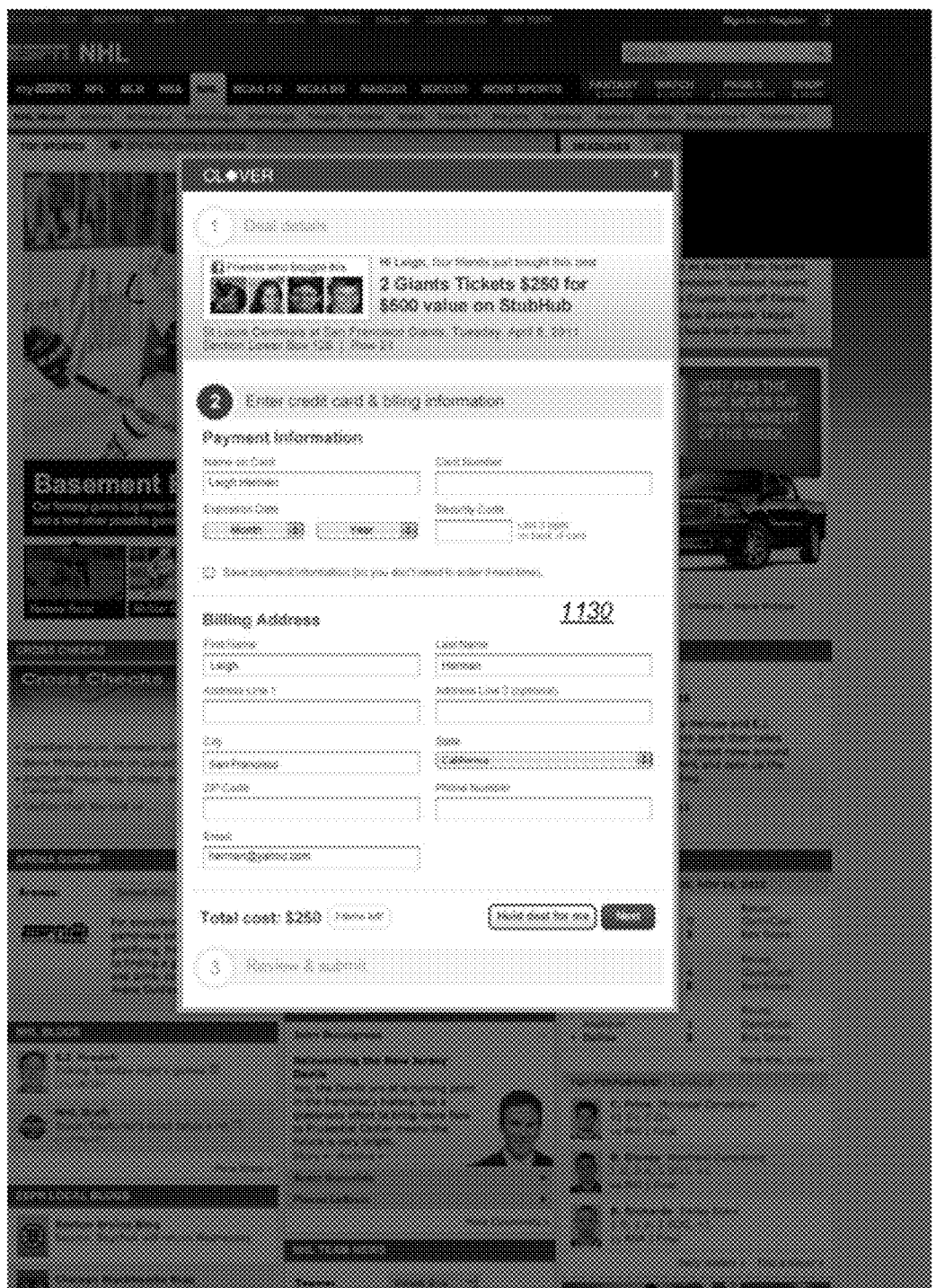
FIG. 12 is a screenshot of a billing display overlaid upon a publisher's website according to some embodiments.
Figure 13:
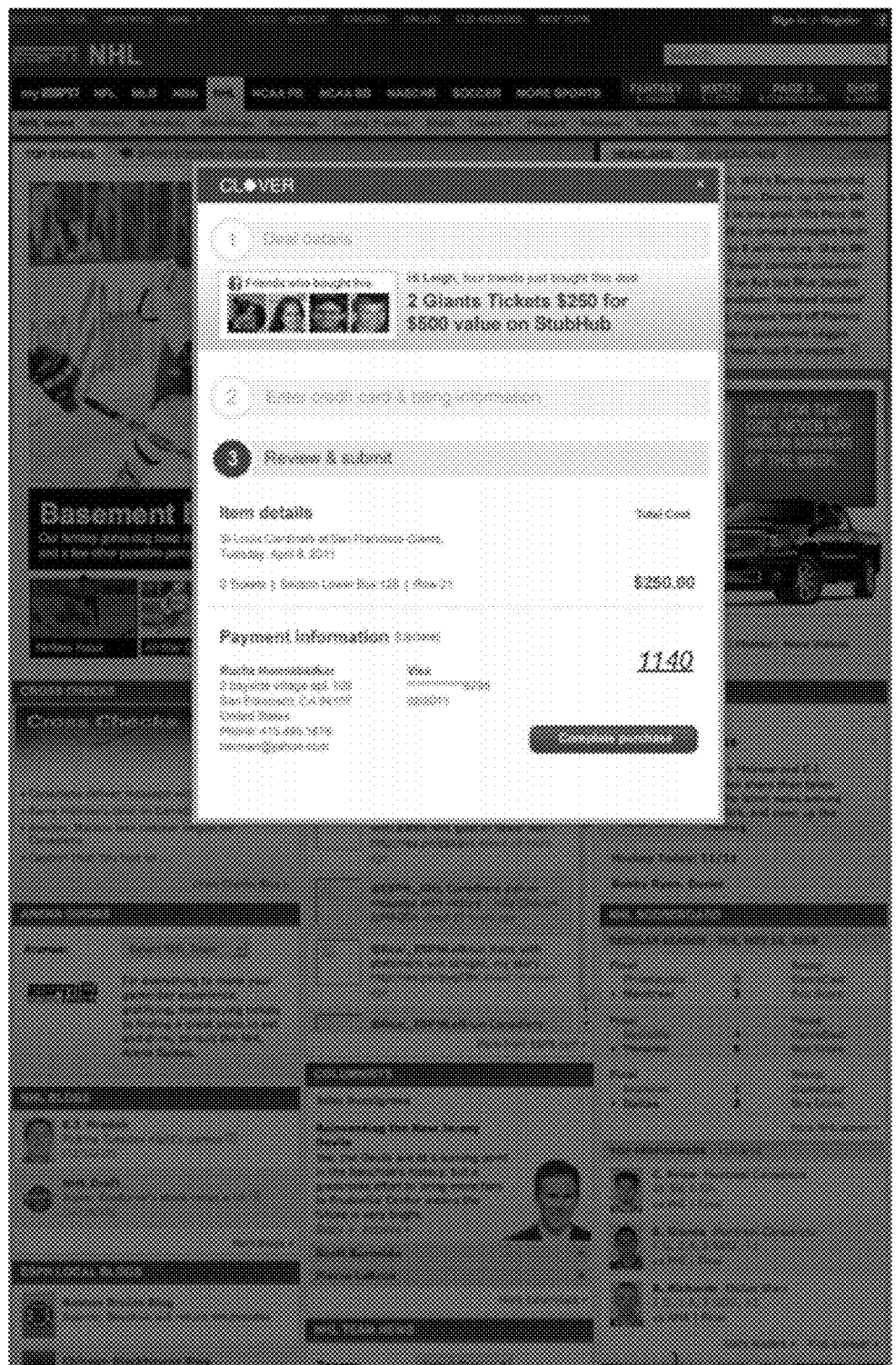
FIG. 13 is a screenshot of a review and submission display overlaid upon a publisher's website according to some embodiments.
Figure 14:
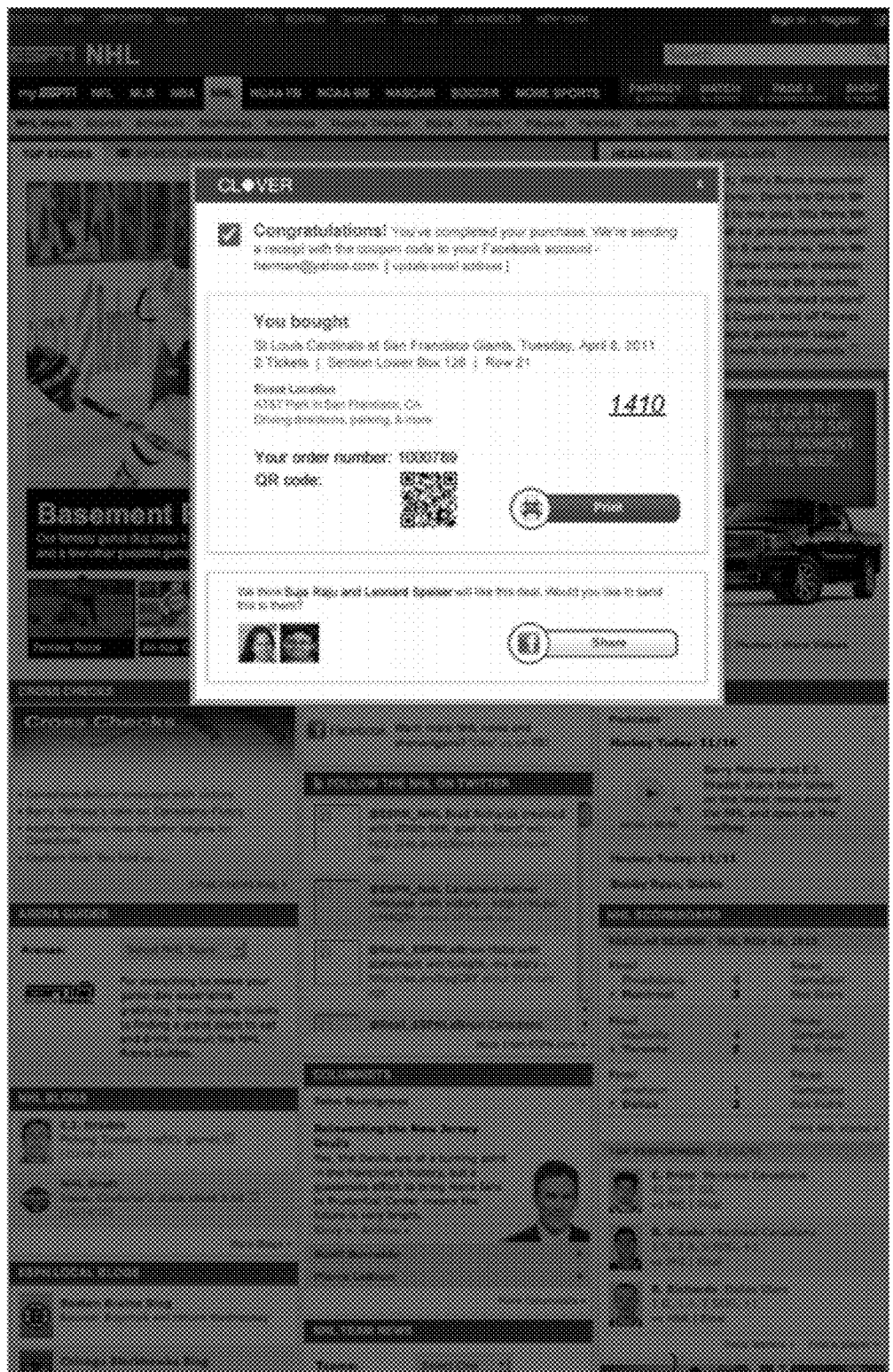
FIG. 14 is a screenshot of a confirmation display overlaid upon a publisher's website according to some embodiments.

As also noted above, at 940 another display may be provided to allow the new user to enter billing and/or fulfillment information (e.g., credit card number, billing and shipping addresses, etc.). An example of a screenshot of a "billing display" 1140 overlaid upon publisher's website 1010 is shown in FIG. 12. Then, at 950, yet another display may be provided to allow the newly signed user to review the order and complete the submission to effect the purchase. An example of a screenshot of a "review and submission" display 1150 overlaid upon publisher's website 1010 is shown in FIG. 13. Still another overlay may then be displayed to provide to the user a suitable form of transaction confirmation and to allow the user to share the offer with his or her friends. An example of a screenshot of a "confirmation" display 1410 overlaid upon publisher's website 1010 is shown in FIG. 14. In some cases, during the sign-up procedure the user may be made aware of an incentive to share the offer with one or more friends.

Figure 15:
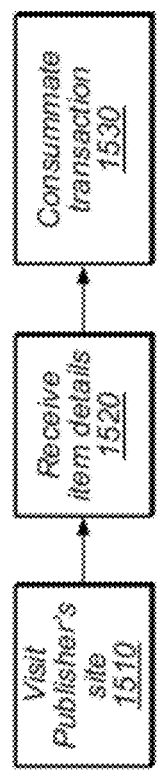
FIG. 15 is a flowchart of a method for signing in a returning user or consumer into the ad network according to some embodiments.
Figure 16:
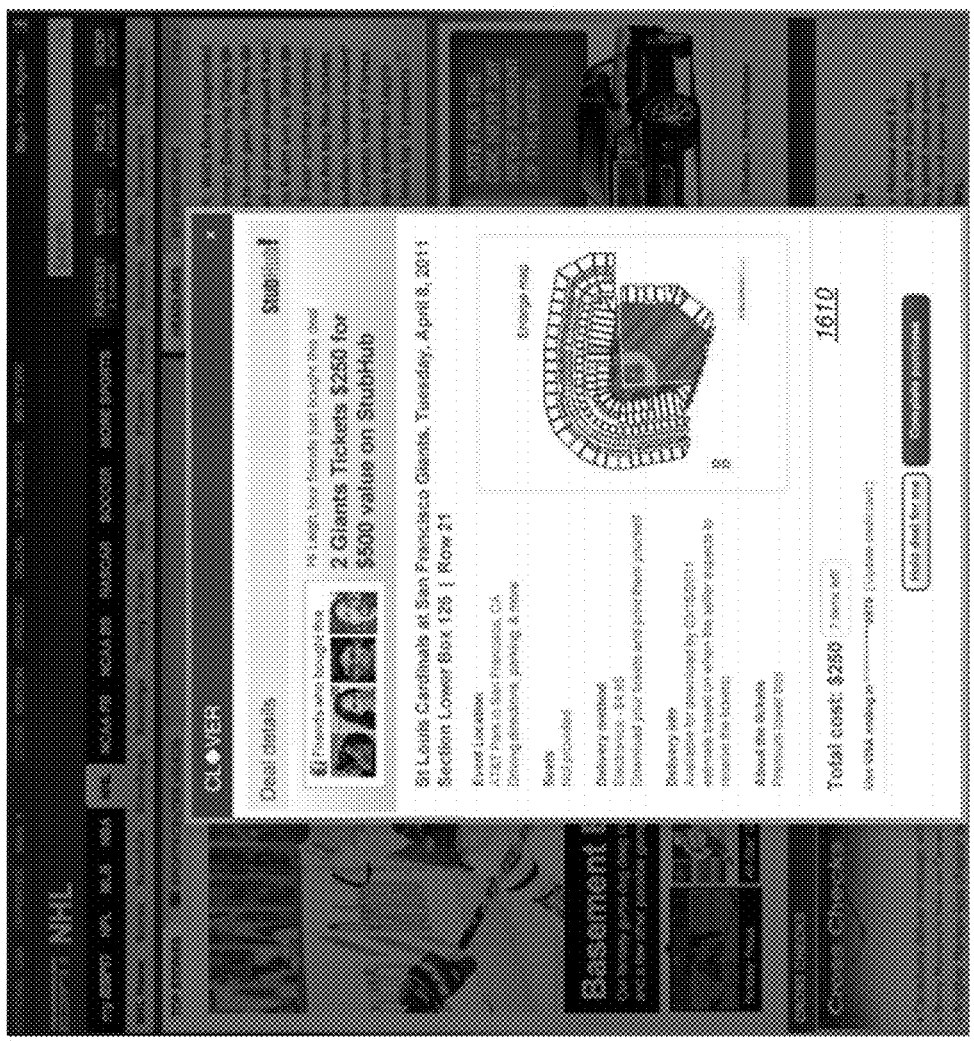
FIG. 16 is a screenshot of a detail display for a returning user overlaid upon a publisher's website according to some embodiments.

In some cases, rather than being a new user, the user may be identified as a "return" user. Further, after the user has signed into the ad network for the first time, subsequent offers may be presented even more succinctly. For example, if a returning user selects an offer, it may not be necessary for the user to re-enter billing or other information. FIG. 15 is a flowchart of a method for signing in a returning user or consumer into the ad network according to some embodiments. At 1510, the user may visit a publisher's web or mobile site (e.g., publisher 130). At 1520, the returning user may receive item details, and at 1530 the returning user may consummate the transaction. Notably, in this example, the method of FIG. 15 may involve fewer operations than the method of claim 9. For example, when ad server 110 recognizes the returning user, table 800 of user account information module 160 may be used to determine that user's preferred method of payment, thus making it unnecessary that the user provide billing information (e.g., as in block 940 of FIG. 9 for new users). Thus, it may in some cases suffice to present a concise deal-detail display. An example of a screenshot of a "detail display for a returning user" 1610 overlaid upon a publisher's site is shown in FIG. 16. In addition, once the user is signed up, ad server 110 may enable offers to be shared with the user's friends, as discussed in more detail below.

In some embodiments, a publisher site may facilitate sharing information with the ad network even without sign in information. For example, suppose a user visits a publisher site. That publisher site, independent of the ad network, may store information regarding the user, such as the user's location, whether the user has previously visited the site, etc. The publisher site may, in some embodiments, include code that permits communication with ad server 110. This communication may include information about the user, such as whether the user is a new visitor to the publisher site. Accordingly, when a user visits a publisher site, that site may supply information to ad server 110 that may affect an offer that is conveyed to the user at the publisher site. For example, if the publisher site indicates to ad server 110 that a user is new to the site, one possible action is for ad server 110 to send the user a deeply discounted offer (e.g., 90%). On the other hand, a returning user might be offered only a 10% discount. Alternately, a user's discount as computed by ad server 110 may be increased depending on the number of consummated offers. Many variations are possible. In short, publishers may provide information that permits ad server 110 to determine who it will it target and what the details of such offers will be.

As described above, in some embodiments, a method may include an advertising computer system (e.g., ad server 110) receiving a request from a consumer (e.g., consumer 120) to receive advertisements from the advertising computer system (e.g., ad advertiser 140), and the advertising computer system causing advertisements to be displayed to the consumer via pages of information sites (e.g., from publisher 130) affiliated with the advertising computer system. Moreover, in some cases the displayed advertisements may be selected based at least in part on information relating to users of a third party information sharing service (e.g., third party sites 150) that are linked to the consumer.

Display of Ads

Figure 17:
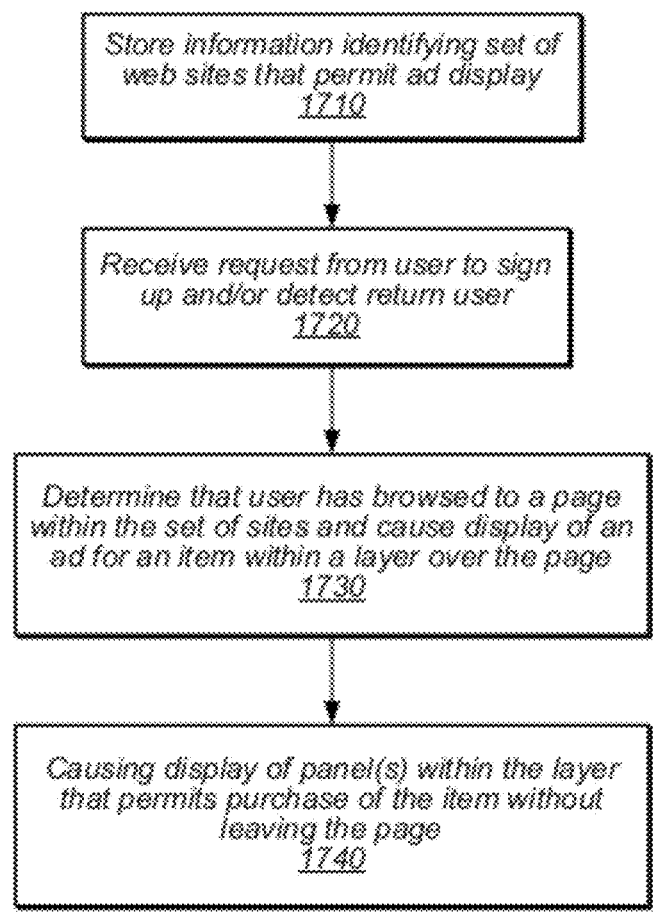
FIG. 17 is a flowchart of a method for presenting and consummating offers without redirection according to some embodiments.

As may be seen from FIGS. 10-14 and 16, ad server 110 may allow a consumer to receive offers and also to consummate transactions without navigating away or otherwise leaving a publisher's site (e.g., without being redirected from a web page). Turning now to FIG. 17, a flowchart of a method for presenting and consummating offers without redirection is depicted according to some embodiments. In some cases, the method may be performed by ad system 200. As illustrated, at 1710 the method may store information identifying a set of web sites (e.g., publishers 130) that permit ad display. At 1720, the method may receive a request from a user to sign up to the ad network. Additionally or alternatively, the method may detect that the user is a returning user. At 1730, the method may determine that the user has browsed to page within the set of sites and cause display of an ad for an item within a layer over the page. At 1740, the method may cause the display of panels within the layer that permit purchase of the item without leaving the web page (i.e., without redirection).

Figure 18:
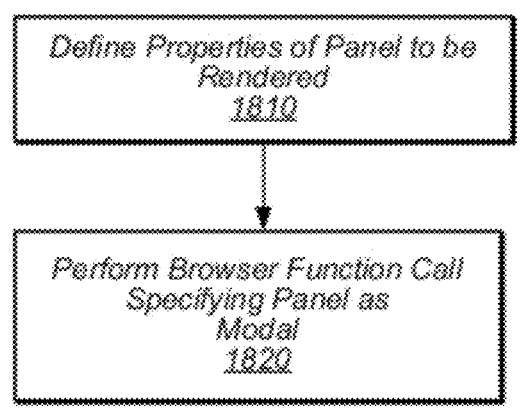
FIG. 18 is a flowchart of a method for rendering panels over a web page according to some embodiments.

Referring to FIG. 18, a flowchart of a method for rendering panels over a web page is depicted according to some embodiments. At 1810, the web page may include code that defines properties for the panel to be rendered such as the panel's location, its size, its contents, etc. (In other embodiments, the web page may reference another web domain that provides such code upon loading the webpage, accessing a link in the web page, etc.) At 1820, the web page performs a browser function call specifying the panel as modal (e.g., a modal window, a modal dialog box, etc.). This function call may be performed differently depending upon the browser rendering the web page. For example, the web page may include the function call to "ShowModalDialog( )" to cause INTERNET EXPLORER to render such a panel.

Some of the examples described herein show a display overlaid upon a site or webpage. Typically, when the user navigates to a publisher's website, JavaScript™ code (or other suitable technology) running on the publisher's site or server may allow subsequent communications to take place directly with the ad server via the display overlays. As a result, ad server 110 may obtain information about which publisher the user is coming from. Once ad server 110 knows a user is on a publisher's site, it may execute one or more algorithms to decide whether to show user an ad and what ad should be shown.

Various embodiments of systems and methods for displaying advertisements are contemplated based on the preceding description, including, but not limited to, the embodiments listed below.

In some embodiments, a method may include a deal system (e.g., ad system 200) storing an indication that a publisher of an information site (e.g., publisher 130) permits the display of advertisements from the deal system. The deal system may cause an advertisement stored by the deal system to be displayed to a consumer (e.g., consumer 120) on top of a page of the site, where the advertisement is for a product or service. Moreover, in response to receiving an indication that the consumer requests to purchase the product or service, the deal system may cause the display of one or more panels on top of the page that permit the consumer to purchase the product or service without being redirected to a different page. In some cases, causing the advertisement to be displayed may further comprise transmitting instructions to the publisher that, when included within the page, enable retrieval of at least a portion of the advertisement from the deal system via a communications network. Further, causing display of the one or more panels may further comprise transmitting the one or more panels to the publisher via the communications network.

In other embodiments, a method may include receiving a request from a user (e.g., consumer 120) to sign up to receive advertisements from an advertising service (e.g., ad system 200) and the advertising service storing information identifying a set of sites (e.g., from publisher 130) that permit the display of advertisements from the advertising service. In response to detecting that the user has browsed to a page within one of the set of sites, the method may include causing the display of an advertisement within a layer over the page, where the advertisement is for an item. Further, in response to the user requesting more information regarding the item, the method may include causing the display of one or more panels within the layer that permit purchase of the item without leaving the page. In some cases, the item may be a service.

In addition, causing the display of the advertisement may be based, at least in part, on rules stored by the advertising service that are specific to the user. For example, the rules stored by the advertising service may be specified by a publisher of the page, and the page may be a web page. Moreover, causing the display of the advertisement may be based at least in part on information identifying one or more other users that are indicated as connected to the user. For example, the information identifying one or more other users may be received from a third-party information sharing service (e.g., third party site 150).

In some embodiments, a method may include receiving a request from a user to sign up to receive web advertisements from an advertising service and the advertising service receiving an indication that the user is using a browser to visit a web page of a publisher affiliated with the advertising service. The method may further include the advertising service selecting one of a plurality of stored advertisements according to a set of rules, where the set of rules includes at least one user-established preference of advertisement type, and the advertising service sending information to a computing device of the user that causes display of an overlay that includes an advertisement of the advertising service, where the overlay occludes the web page at least in part and does not cause the browser to redirect to a different web page.

A method may further include, in response to the user requesting more information about the advertisement, displaying one or more additional overlays on top of the web page without causing redirection of the web page by the browser. In some cases, the one or more additional overlays may permit the user to complete a purchase of a product or service, and where the web page and the one or more additional overlays are displayed on a mobile device.

In other embodiments, one or more non-transitory (i.e., not solely a signal or carrier wave) computer-readable media may be executable within a web page of a publisher to detect that a user of an advertising service is visiting the web page and send information to the advertising service that permits the advertising service to select an advertisement for the user, cause the display of the advertisement on top of the web page, and permit purchase of a product or service corresponding to the advertisement without leaving the web page.

In yet other embodiments, a method may include an advertising computer system receiving a request from a consumer to receive advertisements from the advertising computer system and the advertising causing advertisements to be displayed to the consumer via pages of information sites affiliated with the advertising computer system. In some cases, the displayed advertisements may be selected based at least in part on information relating to users of a third party information sharing service that are linked to the consumer.

In further embodiments, a method may include a computer system of an advertising service causing display of an advertisement to a consumer within a page of a publisher that is distinct from the advertising service, where the consumer is a registered user of the advertising service, and the computer system causing display of additional panels within the page that permit consummation of a transaction based on the displayed advertisement without redirecting away from the page.

Figure 19:
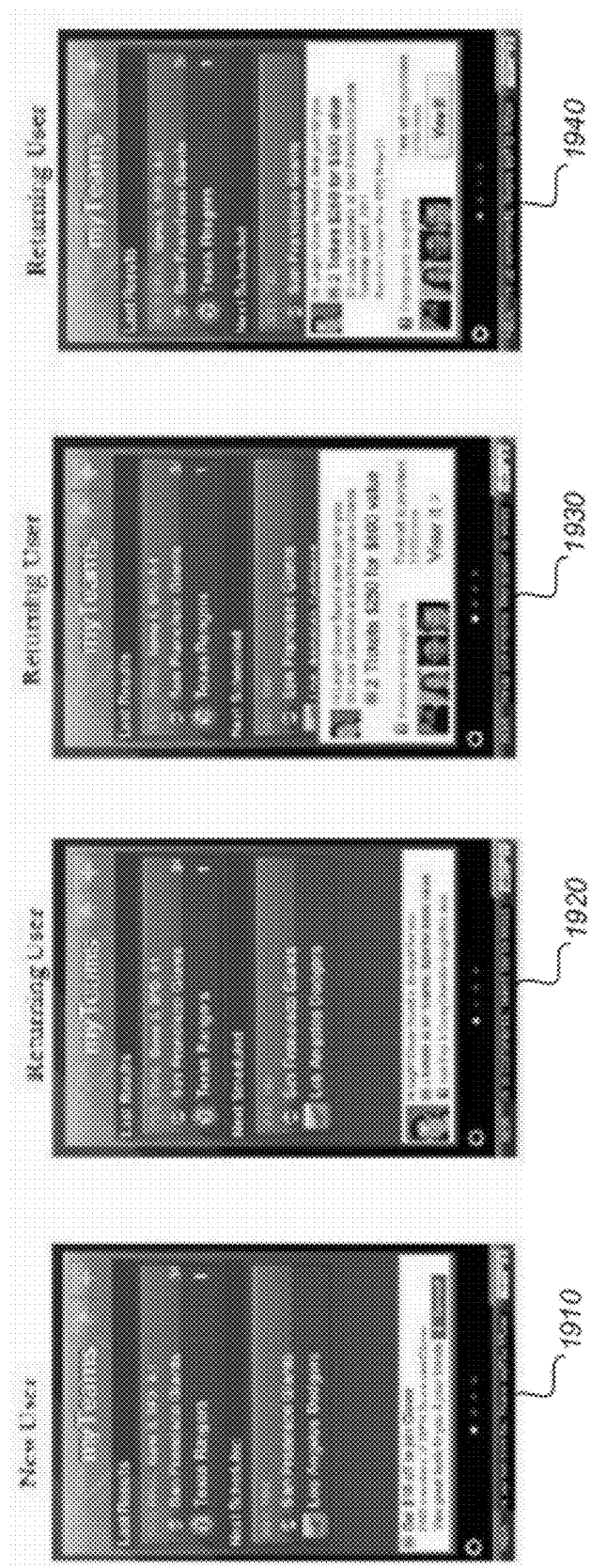
FIG. 19 includes screenshots of mobile device ad displays according to some embodiments.
Figure 20:
FIG. 20 is a screenshot of an ad page with more details according to some embodiments.

In some embodiments, there may be user devices that are not capable of displaying images as shown in FIGS. 10-14 and 16 (e.g., certain mobile devices, tablets, etc). Accordingly, in those cases, ads may be presented, for example, as shown in the screenshots of FIG. 19. Particularly, these screenshots show different mobile device ad displays for a new user 1910 and for returning users 1920-40. As illustrated, screenshot 1920 is personalized for a returning user (compared to screenshot 1910), and screenshots 140 and 1940 may include additional information related to the returning user (e.g., friends, connections, etc.) compared to screenshot 1920. It may also be noted that screenshots 1930 and 1940 occlude a larger portion of the original page than screenshots 1910 and 1920. Turning to FIG. 20, a screenshot of an ad page with more details is depicted. As shown, screenshot 2000 may entirely occlude the original page.

Furthermore, certain ad display techniques discussed herein are not limited to display in a layer (that is, over the subject page). In various implementations, an ad may be displayed as a component of a page (e.g., web page). If a user selects such an ad, however, subsequent display of information may continue to be presented within the page, thus allowing additional information to be displayed to the consumer or consummation of a transaction without being redirected to the merchant's site.

The embodiments described above may be combined in any suitable manner. Furthermore, non-transitory computer-readable memory media that include program instructions executable to implement any of the methods described in this section are also contemplated. Additionally, computer systems or computing devices that are configured to implement any of the disclosed methods are also contemplated.

Ad Targeting

Figure 21:
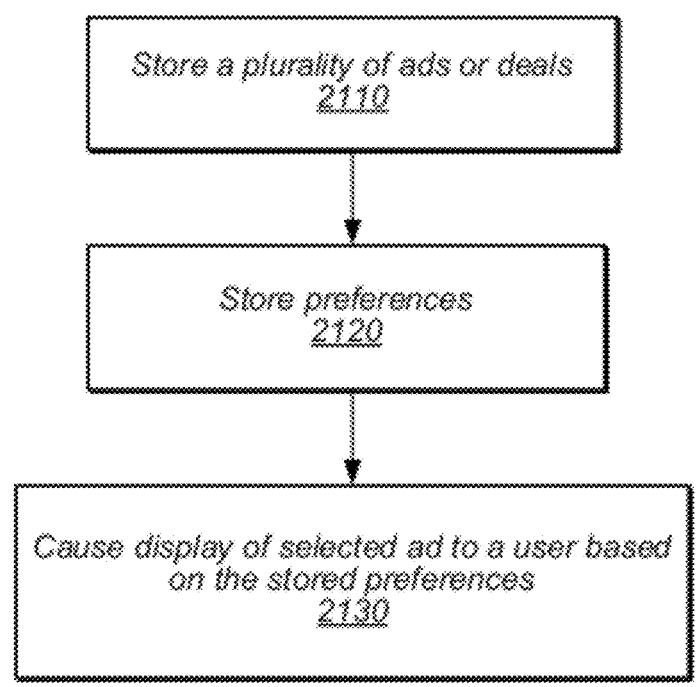
FIG. 21 is a flowchart of a method for providing ads based on preferences according to some embodiments.

In some embodiments, ads presented to consumers 120 may be personalized based on a variety of factors, including preferences, previously consummated transactions, or other information. Turning to FIG. 21, a flowchart of a method for providing an ad based on preferences is depicted. As illustrated, the method stores a plurality of ads or deals at 2120. At 2130, the method stores preferences. And at 2140, the method causes the display a selected ad to a user based on the stored preferences. For example, the selected ad may be displayed as a layer over a publisher's web page that the user may be currently viewing.

In some cases, the stored preferences may be provided by the user during an initial sign up procedure or sometime thereafter. As an example, the user may indicate his or her interests (e.g., sports, cooking, etc.) and determine that only ads related to those interests be displayed. The user may also choose to be presented only with ads from a particular source (e.g., retailer, manufacturer, etc.) and/or that only deals within a particular price range (e.g., $0 to $50) be displayed. As another example, the user may indicate that he or she does not wish to receive any offers for a minimum amount of time (e.g., 1 minute) after visiting a page, or until he or she has visited a specified number of pages. These preferences may be stored, for example, at table 800 of user account information 260 in FIG. 8.

Figure 22:
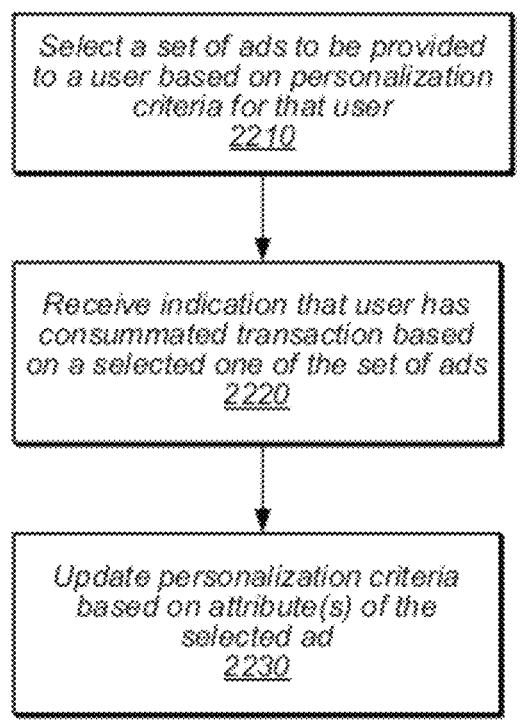
FIG. 22 is a flowchart of a method for providing ads based on consummated transactions according to some embodiments.

Referring to FIG. 22, a flowchart of a method for providing an ad based on consummated transactions is depicted according to some embodiments. At 2210, the method selects a set of ads to be provided to a user based on personalization rules or criteria. For example, the personalization criteria may be set by a user and/or a publisher as described above. At 2220, the method may receive an indication that a user has consummated a transaction based on a selected one of the set of ads. Then, at 2230, the method may update personalization rules or criteria based on one or more attributes of the selected ads. For example, if a user has consummated a transaction of a particular type (e.g., involving an offer for movie tickets), then it may be determined that the user is more likely to consummate that same type of transaction in the future. Hence, preferences stored at table 800 (FIG. 8) may be modified or updated. Accordingly, the updated personalization model may, in some cases, be usable to affect future selection for ads for the same and other users of the advertising network.

In some embodiments, ads presented to consumers 120 may be personalized based on information other than preferences or transaction history. For example, ad server 110 may execute an algorithm to indicate that the user should not be shown certain ads (or perhaps any ads) at least until he or she has had a chance to browse a certain amount of the publisher's content or visit the publisher's website for a certain period of time. Another algorithm may identify a user's location from an expected place of consumption of a particular offer (e.g., the user lives 2 minutes away from restaurant W), and thus determine that the ad be displayed. This identification may be made, for example, by information received from a social media or information sharing service or website. Yet another algorithm may detect that one of the user's friends has just checked into restaurant W, and accordingly determine that the ad be displayed to the user. In some embodiments these and other algorithms may be subject to a conversion rate determination as described herein.

As noted above, ad server 110 is capable of individually targeting future offers to a user or groups of users. Such personalization may be performed, for example, based on the user's age, gender, location, interests, etc. Moreover, individualized targeting may be performed to increase or maximize a conversion rate and/or revenues. In some embodiments, individualized advertisement targeting may be based on any combination of suitable variables such as, for example, the percentage of a discount, the credibility of a discount, the absolute price, a historical conversion rate for the offer (or similar offers), a historical conversion rate for offers (or similar offers) by this advertiser or merchant, a publisher website where the offer appears, a publisher site category where the offer appears, a number of times a particular user has seen the same or similar offers, the time of day, the day of month, the month of year, the user's browser (e.g., INTERNET EXPLORER, SAFARI, CHROME, FIREFOX, etc.), the user's device type (e.g., desktop, tablet, phone, etc.), the user's distance from a particular location, the price sensitivity of user, distance from home, distance from work, distance off-route between home and work, business's rating (e.g., YELP, etc.), business's number of ratings, number of friends that have joined the ad network, number of friends that have bought at least one item through the ad network, number of friends that have bought something from a particular advertiser or merchant through the ad network, number of friends who have bought this particular deal, number of friends who "liked" or "befriended" the business on a particular social network, number of friends who checked into a particular merchant or advertiser through a social network, whether the user follows this merchant or advertiser on TWITTER or the like, number friends who follow this merchant or advertiser on TWITTER, whether similar users have purchased the item offered (e.g., based on purchase history purchased this offer, HUNCH-style personality testing, etc.), whether the offer is in a category for which user has made a purchase before, the age of user, the gender of user, the education of user, the income of user, categories of websites visited by user, the user's marital status, the user's housing or living arrangements, whether the user has kids and their ages, the user's religious affiliation, the user's field of occupation, etc.

Various ones of the attributes described above may be obtained from explicitly expressed user preferences, third-party information sharing services (e.g., FACEBOOK), websites, etc. Still other attributes may be determined implicitly. For example, it may be detected that a user has accessed ad server 110 from two different IP addresses. Because IP addresses may be linked to physical location of the user, certain combinations of these IP addresses may be used to indicate home and work locations of the user, particularly if access occurs from these IP addresses regularly (and/or at certain times of the day). Accordingly, in certain embodiments, ad server 110 may present offers to the user for goods or services of a merchant having a location between the user's home and work locations. For example, ad server 110 may determine that a particular user accesses the Internet from a Manhattan IP address during business hours and from a New Jersey IP address in the evening. In such an instance, ad server 110 might query a third-party service (e.g., a navigation database) to determine a likely route for the user's commute and create offers located along this route. In determining ads to present, certain points along the route may be prioritized. For instance, it may be considered unlikely that a user would stop to consummate a transaction soon after beginning his or her commute. Conversely, a user may be much more likely to stop at other points in the commute, such as near a freeway exit, near a public transportation terminal, close to home, etc. Thus, in one embodiment, ad server 110 may be configured to determine that a user is accessing the ad network from two different locations that indicate a likelihood that the user commutes between the two locations, determine one or more potential routes for the commute, determine one or more locations along one of the routes, and then use the determined locations to target ads for the user.

In some embodiments, ad server 110 may be configured to determine whether a particular offer should be made to a particular user (or group of users) based on the offer's projected conversion rate. A projected conversion rate may be obtained, for example, using any combination of the variables discussed above (or any other suitable variable). Another factor that may be taken into account when deciding whether to present the offer is the expected revenue for that offer. Therefore, in some cases, by combining the projected conversion rate with the expected revenue, ad server 110 may maximize or otherwise increase the volume of transactions consummated through the network.

Ad server 110 may also be configured to perform place-based targeting (and retargeting), as well as friend-based targeting (and retargeting) of ads. As an example, if a user has visited a first merchant the previous week (as may be identified from the user's social network status, history, etc., GPS information, etc.), ad server 110 may cause an ad to be displayed for a deal for a second merchant near the first one. Additionally or alternatively, ad server 110 may retarget the same user with a future offer from the first merchant. As another example, if one of the user's friends is visiting a particular store, then that information may be used to target the friend (e.g., share an offer) or to target the user (e.g., the user's friend likes a particular product, so it is probable that the user also likes the same product or type of product). These techniques are discussed in more detail below.

As described above, various embodiments of systems, methods, and computer-readable media for advertisement targeting are contemplated. Exemplary embodiments are set forth below.

In some embodiments, a method may include an advertising system storing information for a plurality of deals, and the advertising system also storing preferences for a plurality of users of the advertising system. The method may also include the advertising system causing the display of a web page advertisement for a first of the plurality of users based at least in part of the stored preferences for the first user. In some cases, the web page advertisement may be displayed over a first web page, and the method may further include the advertising system causing the display of the web page advertisement only after a period of time has elapsed since the user arrived at the first web page. For instance, the period of time may be based on a rule stored by the advertising system, and the rule may be established by a publisher of the first web page.

In other embodiments, a computer system of an advertising service may include one or more processors and a memory storing program instructions executable by the one or more processors to store deal information for a plurality of merchants, store user preference information for a plurality of consumers, and store advertisement display information for a plurality of publishers. The program instructions may be further executable to display an advertisement to a first of the plurality of consumers, where the web advertisement is displayed over a page of a first of the plurality of publishers, where the advertisement is based on deal information stored by the computer system for a first of the plurality of merchants, and where the advertisement is selected for display based on preference information and advertisement display information stored by the computer system for the first consumer and the first publisher, respectively.

The embodiments described above may be combined in any suitable manner. Furthermore, non-transitory computer-readable memory media that include program instructions executable to implement any of the methods described in this section are also contemplated. Additionally, computer systems or computing devices that are configured to implement any of the disclosed methods are also contemplated.

Ad Sharing

In addition to providing deals to a user, ad server 110 may also show deals for that user's friends. For example, deals may be forwarded on to a friend via email or other form of online communication. The targeting may work in a similar fashion as described in the previous section, but it may, for example, use data provided by users about their friends. Deals may appear for a given user across any site from one or more publishers and on any browser or device, including mobile applications. In some cases, the user's friends may be registered with the ad network. In other cases, the user's friends may not have yet registered.

Figure 23:
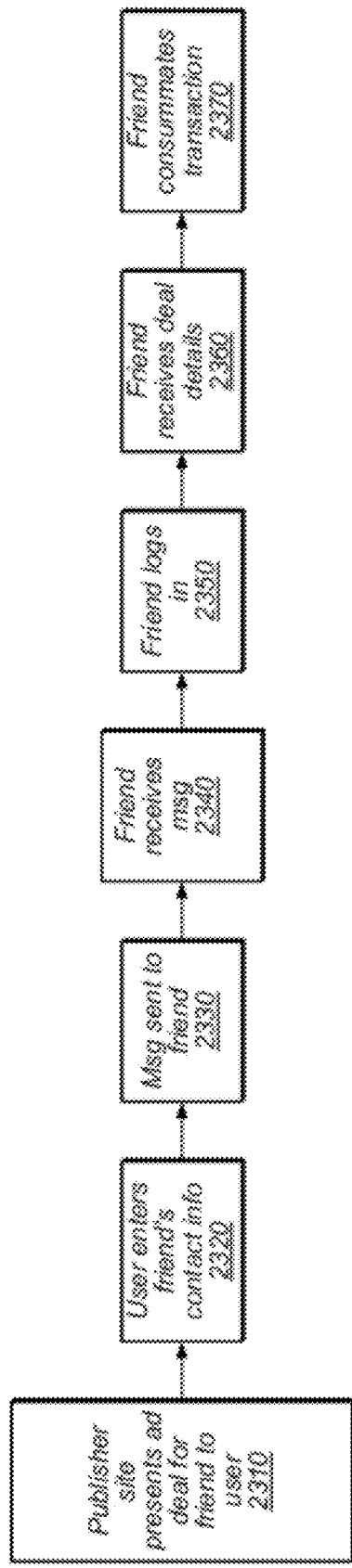
FIG. 23 is a flowchart of a method for allowing a user to share a deal with a friend through an ad network according to some embodiments.
Figure 24:
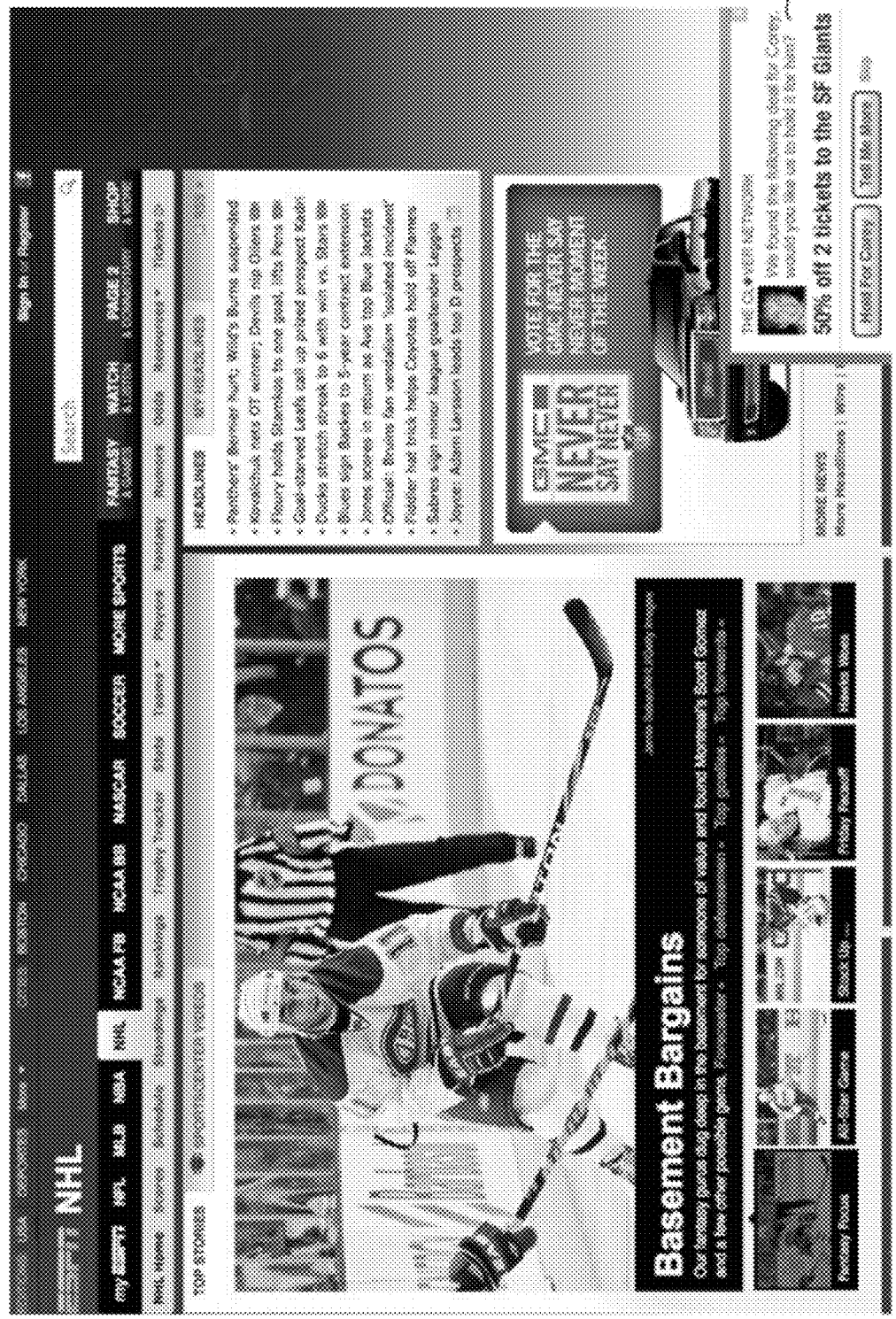
FIG. 24 is a screenshot of a share a deal display overlaid upon a publisher's site according to some embodiments.
Figure 25:
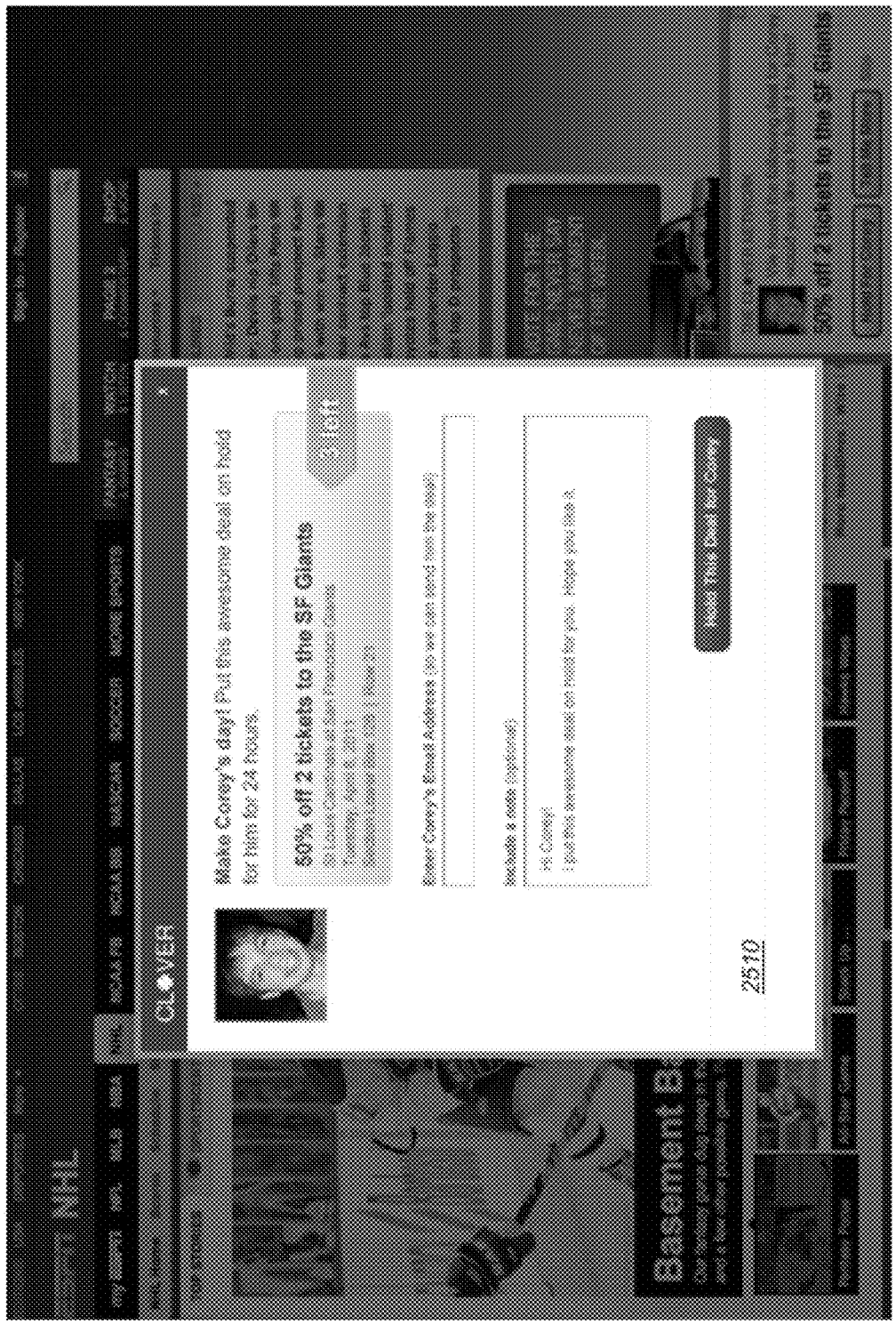
FIG. 25 is a screenshot of a friend contact display overlaid upon a publisher's site according to some embodiments.
Figure 26:
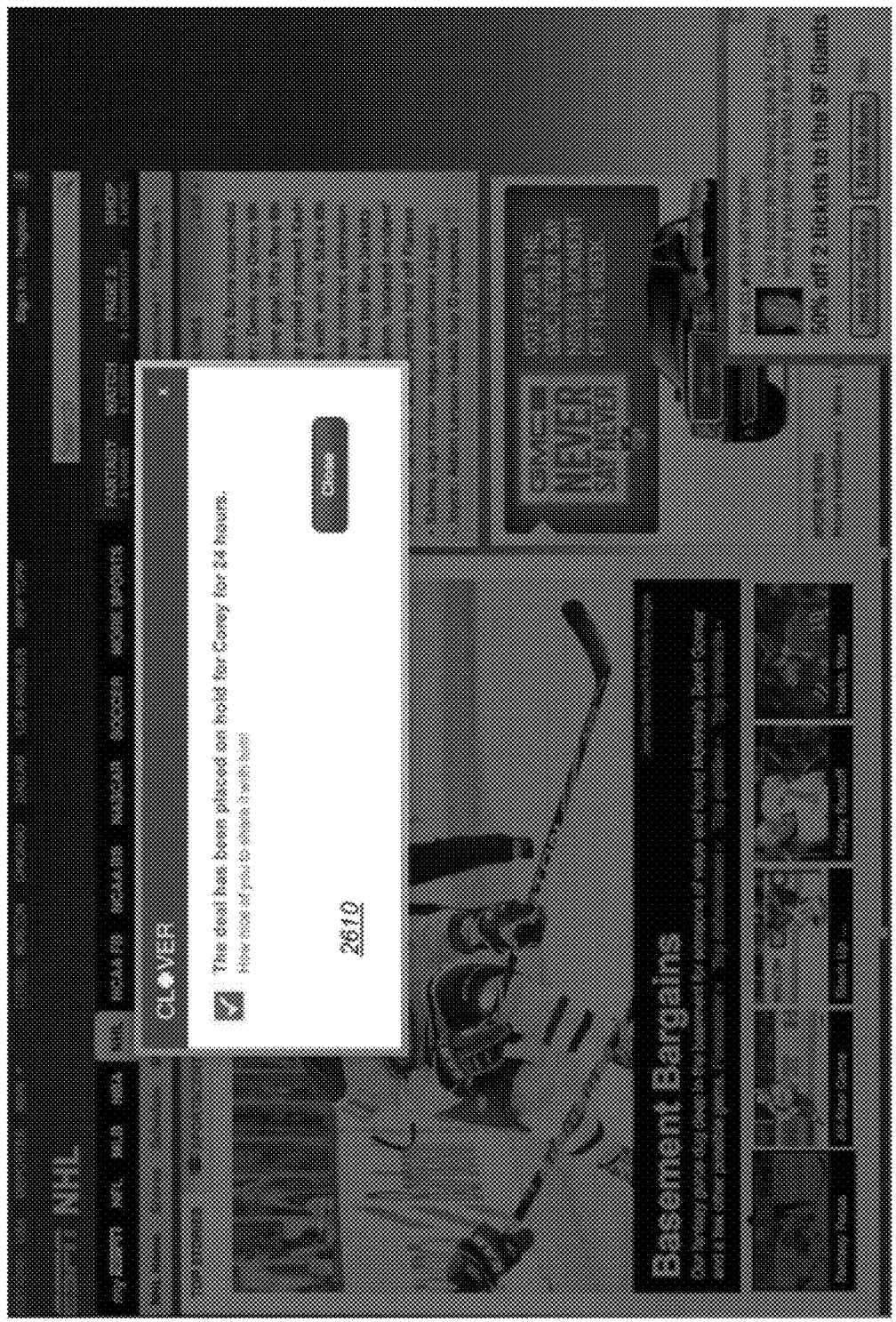
FIG. 26 is a screenshot of a hold confirmation display overlaid upon a publisher's site according to some embodiments.
Figure 27:
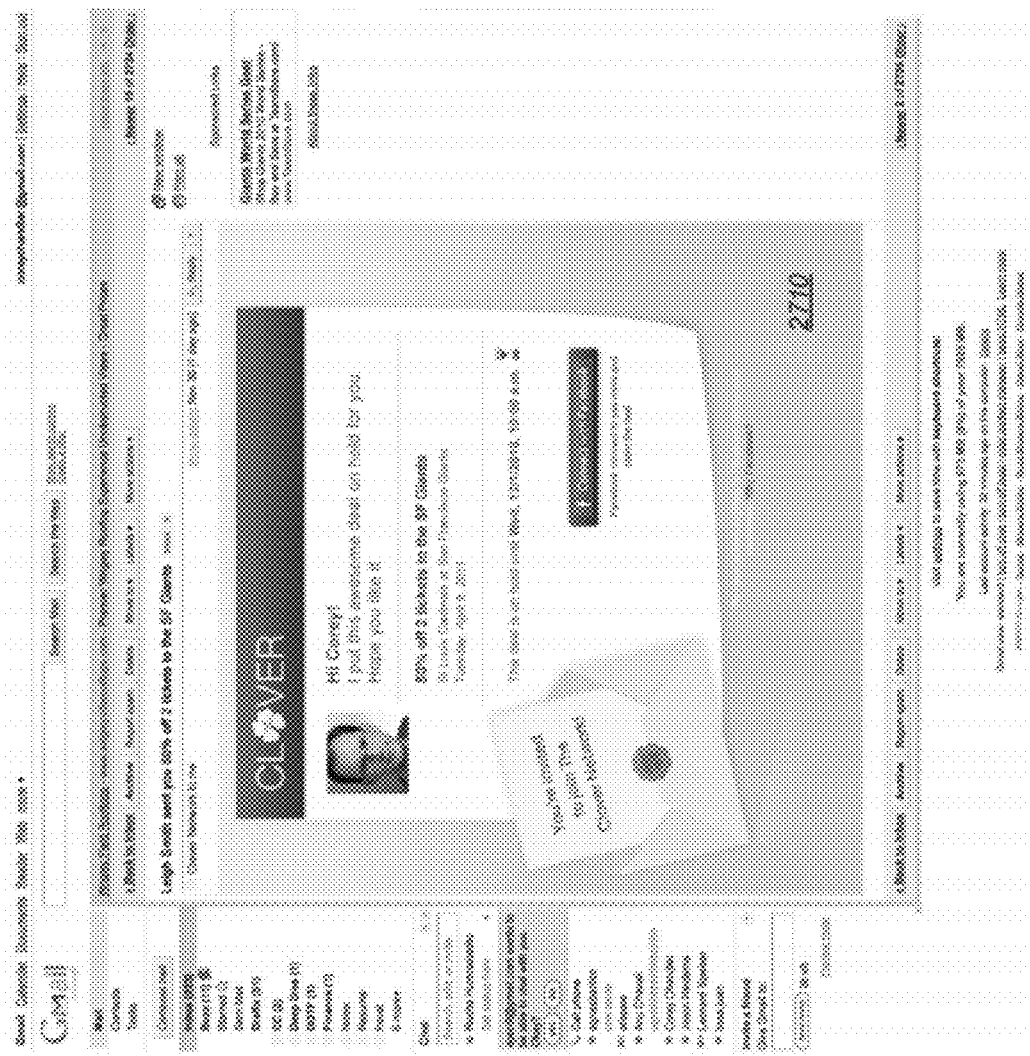
FIG. 27 is a screenshot of an email message communicating a deal to a user's friend according to some embodiments.
Figure 28:
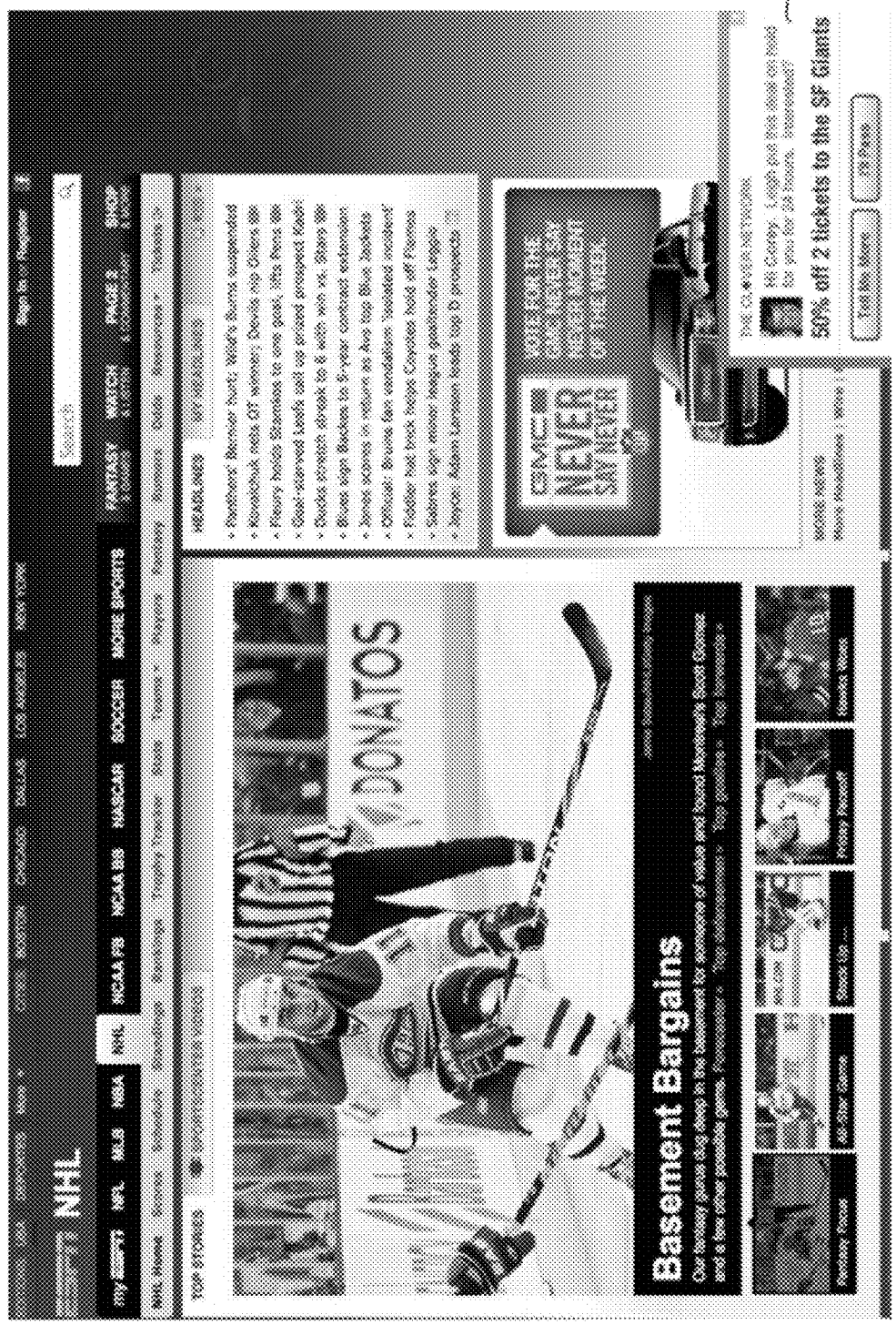
FIG. 28 is a screenshot of a display overlaid upon a publisher's site communicating a deal to a user's friend according to some embodiments.

Turning now to FIG. 23, a flow chart of a method for allowing a user to share a deal with a friend through an ad network is shown according to some embodiments. At 2310, a publisher may present an ad to a user via its website, where the ad suggests that the offer would be interesting to one or more of the user's friends. An example of a screenshot of a "share a deal" display 2410 overlaid upon a publisher's site is shown in FIG. 24. At 2320, the user may provide the friend's email address, phone number, social network account name, or other contact information. An example of a screenshot of a "friend contact" display 2510 overlaid upon a publisher's website is shown in FIG. 25. At 2330, the method may cause that a message (e.g., email, text messaging, instant messaging, SMS, phone call, etc.) containing the offer be sent to the user's friend. An example of a screenshot of a "hold confirmation" display 2610 overlaid upon a publisher's site is shown in FIG. 26. Then, the method may send a message or it may otherwise contact the user's friend using the information provided to communicate the deal. An example of a screenshot of a message communicating the deal to the user's friend is shown as email 2710 in FIG. 27. Additionally or alternatively, the offer may be communicated to the user's friend the next time the friend visit the publisher's site via panel 2810 shown in FIG. 28.

As described above, various embodiments of systems, methods, and computer-readable media for advertisement sharing are contemplated. Exemplary embodiments are set forth below.

For example, in some embodiments, a method may include an advertising system permitting a registered user of the system to share advertisements with other individuals. And, in some cases, these other individuals may not otherwise be registered users of the advertising system.

The embodiments described above may be combined in any suitable manner. Furthermore, non-transitory computer-readable memory media that include program instructions executable to implement any of the methods described in this section are also contemplated. Additionally, computer systems or computing devices that are configured to implement any of the disclosed methods are also contemplated.

Modeling the Behavior of Other Users

In some embodiments, personal information associated with one user may be used to model the expected purchase behavior of another user. For example, when a consumer provides the ad network service with personal information and some indication of intent to buy a good or service, that data may be modeled against their friends in a social network or the like. In some cases, the ad network may use a social network, such as FACEBOOK, or may have its own social network to track relationships between people. As a result, the ad network may apply the buying intent or behavior of one customer to someone else in his or her network to determine the best-targeted deal to offer. For instance, if a user recently provided an indication to a social network site regarding a visit to Restaurant X, the ad network may, based on that indication, offer the user's friends a prepaid service at Restaurant X as well. Additionally or alternatively, the ad network may offer the user's friends a prepaid service at restaurants in the same category as Restaurant X, in a similar region to Restaurant X, or having a similar level of quality. Moreover, social network data may be used to generate an expected probability of purchase by people in that network. Other examples of data that may be used to model the behavior of other users are described throughout this specification.

Figure 29:
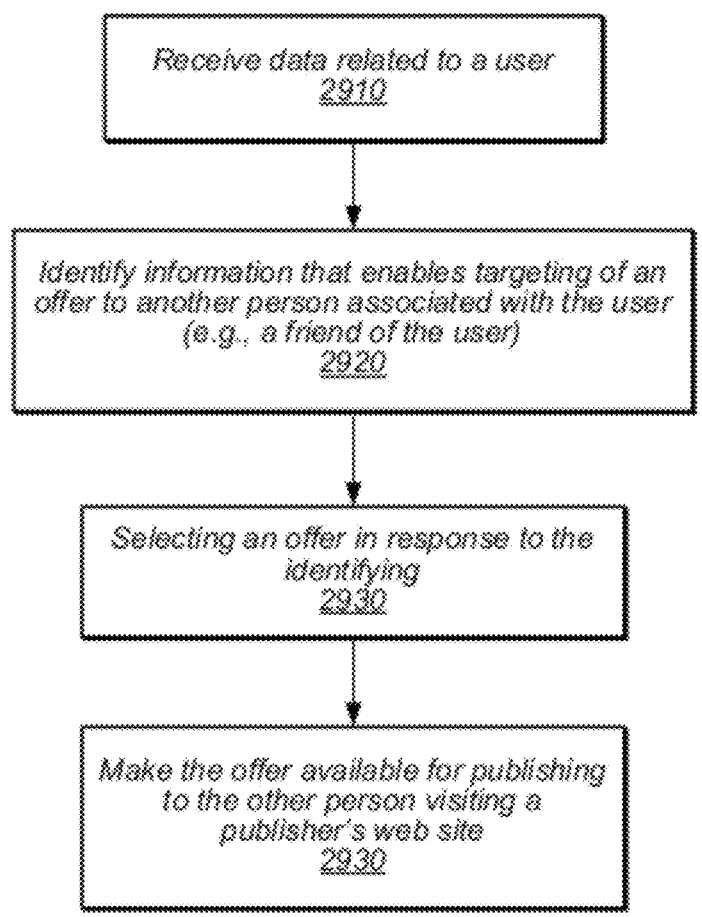
FIG. 29 is a flowchart of a method for modeling the behavior of other users according to some embodiments.

Turning to FIG. 29, a flowchart of a method for modeling the behavior of other users is depicted according to some embodiments. At 2910, the method may receive data related to a user. For example, the data may be received from a social network at an ad server (e.g., a computer associated with an ad system such as element 100). At 2920, the method may identify, among the received data, information that enables targeting of an offer to the user (or to another person) associated with the user (e.g., a friend of the user). For example, the information may include a merchant's name, and may be provided by a friend of the user's in the social network. At 2930, the method may select an offer in response to the identifying. And at 2930, the method may make an offer available for publishing to the user (or to the other person) visiting a publisher's website.

As described above, various embodiments of systems, methods, and computer-readable for modeling the behavior of other users are contemplated. Exemplary embodiments are set forth below.

For example, in some embodiments, another method may include a computer system of an advertising service (e.g., ad server 110) receiving information relating to a user of the advertising service (e.g., consumer 120), where the information indicates one or more other individuals that are linked to the user via an information sharing service or social network (e.g., third-party site 150). The method may also include the computer system selecting an ad for the user based at least in part on received information describing preferences, historical purchase information, or a current context of the one or more other individuals. In some cases, the received information may indicate that the one or more other individuals are friends of the user. Further, the current context may indicate a physical location of one of the one or more other individuals.

The embodiments described above may be combined in any suitable manner. Furthermore, non-transitory computer-readable memory media that include program instructions executable to implement any of the methods described in this section are also contemplated. Additionally, computer systems or computing devices that are configured to implement any of the disclosed methods are also contemplated.

Verification of Online Transactions Consummated Offline

Certain advertisements can lead to online consummation of a transaction. For example, an advertisement for a digital download may be presented to a consumer, who then wishes to purchase the download. The consumer may enter his or her billing information (e.g., credit or debit card, bank account), or indicate that previously entered billing information should be used to make the purchase. In an embodiment, once this information is entered, the consumer may be directed to a website to initiate the download (or the download may be started automatically). In this type of transaction, the purchase is made online, and is also consummated (i.e., fulfilled) online.

In contrast, certain purchases may be made online and consummated offline. Examples include purchase a prepaid service/product from a business, such as a meal at a restaurant or a shirt at a clothing store. For example, a consumer may pre-purchase a deal specifying $50 worth of food for $40 from an ad service's website or a link provided via email. The consumer may then be permitted to print out a coupon that may be presented to the merchant to redeem the merchandise. The merchant in turn can notify the service that the coupon has been redeemed; the service and merchant then share a portion of the revenue from the sale. A drawback of such a system, however, is that there is no mechanism in place to prevent a merchant from claiming the consumer redeemed a coupon when in fact this has not happened. For example, a merchant may claim to an advertising service that a consumer has redeemed a product or service when this has not happened or when there is a dispute between the consumer and merchant over whether the order was properly fulfilled.

In an embodiment, an advertising network may provide two codes to a customer to facilitate a transaction that is consummated offline. (These codes may be referred to as "coupon codes" in that they are usable to purchase a product or service, perhaps at a discount). In various embodiments, these codes may be received at a computer system or mobile telephone or other similar device via one or more networks. In an embodiment, the customer receives at least two codes upon purchasing the product or service. In this embodiment, the first code may be unique to the product/service and customer and is also sent to the merchant. In another embodiment, this code may be referred to as a transaction id. It may be randomly generated in some implementations. When a merchant receives the first code, it can be verified that that customer purchased the item. The second code is unique to the user and is sent to the customer, but not the merchant. When the merchant provides the second code (e.g., to a computer of an ad network system), it can be verified that the customer did in fact receive the product/service. In an embodiment, the customer only shares the second code when he or she is satisfied that the merchant has delivered said product/service. Such a methodology prevents a merchant acting in bad faith from asking the ad system for revenue from a transaction that was not actually redeemed.

In some cases, a product or service may be delivered or provided in two or more phases, stages, or installments. For example, a particular deal may require that a merchant deliver a particular product (e.g., stage one) and then install it (e.g., stage two). The same deal may also require that the merchant tune-up the product after sometime after installation (e.g., stage three). As another example, a given deal may prescribe that a particular product (e.g., medicine, magazine subscriptions, etc.) be delivered periodically (e.g., weekly, monthly, etc.) and/or in a number of installments. In these types of situations, the advertising network may provide a suitable number of codes that correspond to each distinct stage or installment. In this manner, the customer may only share a particular code with the merchant when he or she is satisfied that the merchant has satisfactorily completed the corresponding stage, and the merchant may receive partial payment upon completion of each stage. Furthermore, the various codes associated with a single transaction may not be provided to the customer at once. In some cases, for example, the advertisement network may provide a second code to the customer only after the merchant has redeemed the first code, and so on. This may prevent the customer from inadvertently providing the second code to the merchant prior to completion of a prior stage in the transaction.

Figure 30:
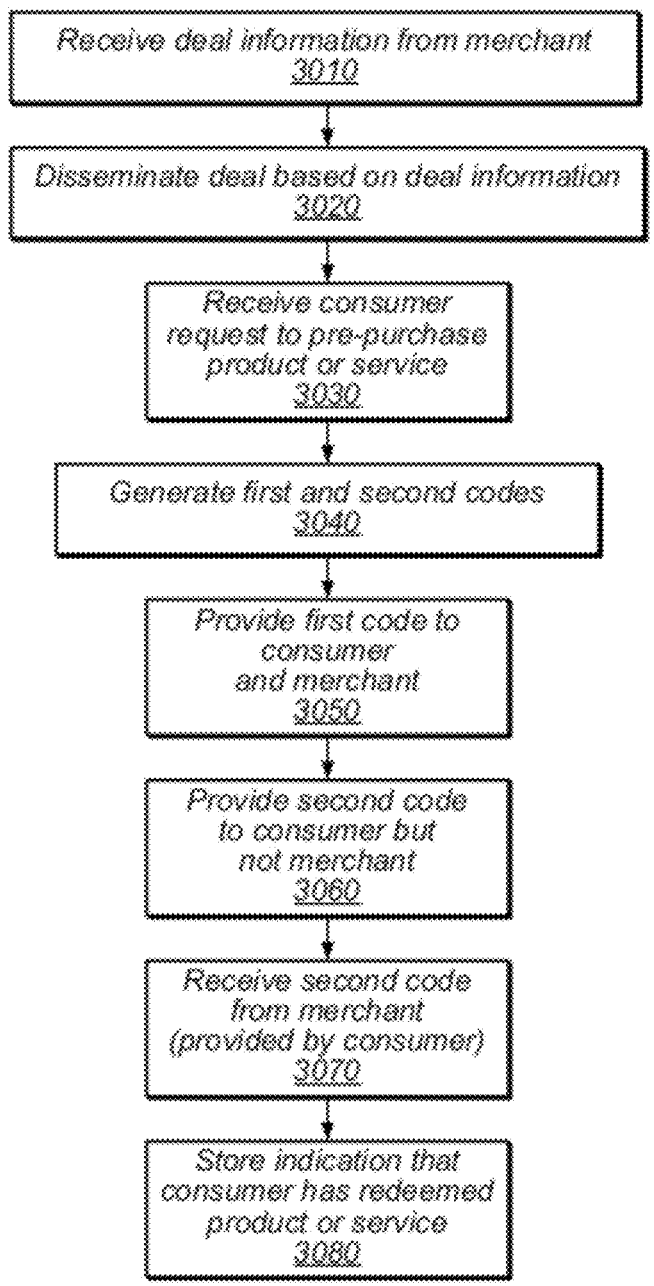
FIG. 30 is flowchart of a method for verifying online transactions consummated offline from the perspective of an ad network according to some embodiments.

Turning now to FIG. 30, a method for verifying online transactions consummated offline is depicted from the perspective of an ad network according to some embodiments. At 3010, the ad network may receive deal information from a merchant or advertiser. At 3020, the ad network may disseminate the deal based on the received deal information. At 3030, the ad network may receive a consumer's request to pre-purchase the product or service that is a part of the deal. Accordingly, at 3040 the ad network may generate a first and a second code, provide the first code to both the consumer and the merchant at 3050 and provide the second code to the consumer but not to the merchant at 3060. Then, at 3070 the ad network may receive the second code from the merchant (as provided by the consumer upon the consumer's redemption of the product or service), and at 3080 the ad network may store an indication that the consumer has redeemed the purchased product or service.

Figure 31:
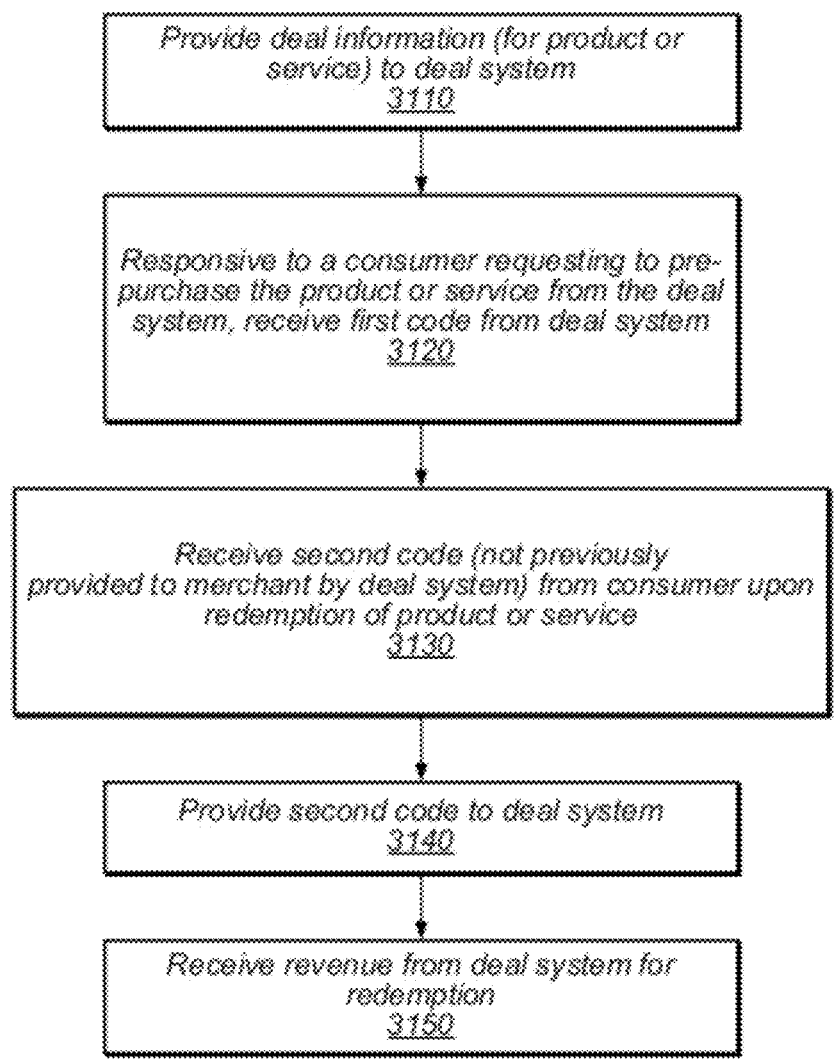
FIG. 31 is flowchart of a method for verifying online transactions consummated offline from the perspective of a merchant according to some embodiments.

Referring to FIG. 31, a method for verifying online transactions consummated offline is depicted from the perspective of a merchant according to some embodiments. At 3120, the merchant may provide deal information (e.g., for a product or service being offer for sale) to a deal system. In response to a consumer requesting to pre-purchase the product or service through the deal system, the merchant may at 3130 receive a first code from the deal system. At 3140, the merchant may receive a second code (not previously provided to the merchant by the deal system) from the consumer upon redemption of the product or service. At 3150, the merchant may provide the second code to the deal system. And at 3160 the merchant may receive the proceeds from the sale of the product or service from the deal system.

Figure 32:
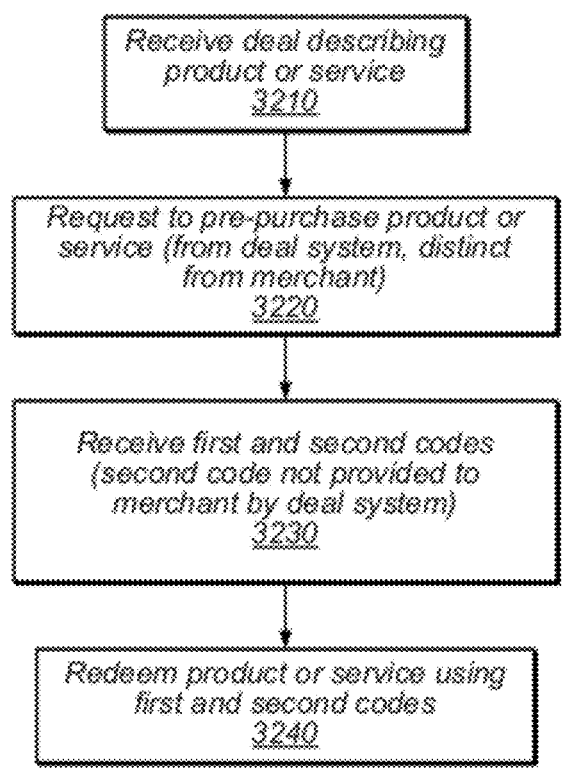
FIG. 32 is flowchart of a method for verifying online transactions consummated offline from the perspective of a consumer according to some embodiments.

FIG. 32 shows a method for verifying online transactions consummated offline from the perspective of a consumer according to some embodiments. At 3200, a consumer may receive an offer describing a product or service. At 3210, the consumer may request to pre-purchase the product of service from the deal system, which may be distinct from the merchant that is making the offer. At 3230, the consumer may receive first and second codes, where the second code is not provided to the merchant by the deal system. Then, at 3240, the consumer may redeem the product or service using the first and second codes.

Figure 33:
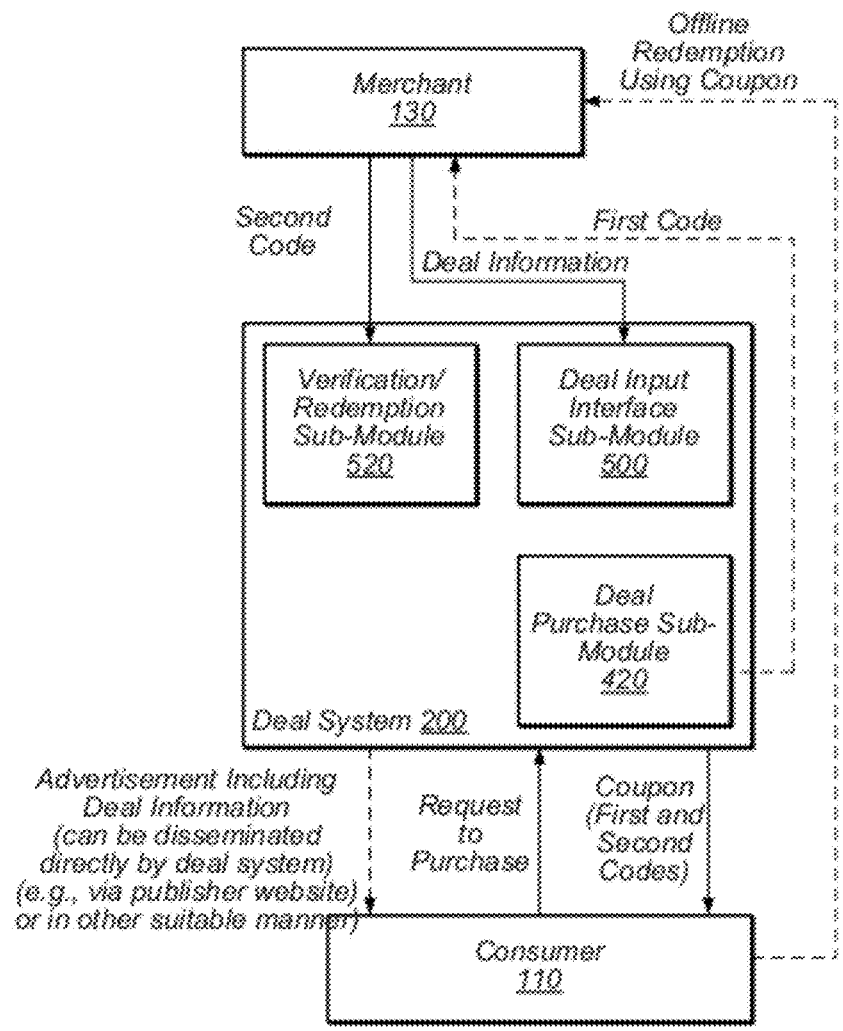
FIG. 33 is a block diagram of modules involved in the verification of online transactions consumed offline is depicted according to some embodiments.
Figure 33:
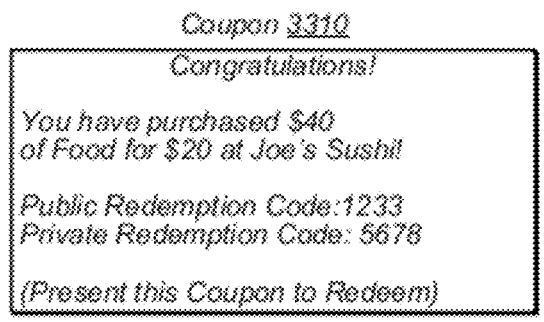

Turning to FIG. 33, a block diagram of modules involved in the verification of online transactions consumed offline is depicted according to some embodiments. As described above, merchant or advertiser 140 may provide deal interface sub-module 500 (also shown in FIG. 5) of deal system 200 with deal information. Deal system 200 may provide an advertisement including deal information that may be disseminated directly by the deal system itself (e.g., via publisher website) or in other suitable manner. Consumer 120 may then request to purchase an advertised item, and receive first and second codes in response. Meanwhile, merchant 140 may receive the first code only. This functionality may be implemented, for example, by one deal purchase sub-module 420 (shown in FIG. 4). An example of the first and second codes is shown as coupon 3360 as public and private redemption codes, respectively. During offline consummation, consumer 120 may present coupon 3310 to merchant 140. Merchant 140 may then provide the newly acquired second code to verification/redemption sub-module 520 of deal system 200, and may thereafter receive the proceeds from the transaction.

In some embodiments, the ad system may classify the merchant based on various factors (how well known the merchant is, etc.). Thus, in case of an established merchant (e.g., GAP, etc.), the ad system may deposit 100% of the revenue upon consummation. On the other hand, for an unknown or lesser-known merchant, the ad system may only transfer part of the funds upon consummation, and the rest upon receiving the second code indicating redemption has actually occurred, therefore also serving as an escrow service. In some cases, the ad system may not deposit any of the funds to the merchant until redemption is verified through the second code. In one embodiment, a merchant's classification may change over time according to its redemption history.

In some cases, different classifications may be used to indicate a merchant's level of trust. For example, when first enrolling in the ad network, a merchant may be designated as a "new merchant," or the like. The same merchant may be approved after a number of successful transactions, a dollar volume of transactions, a length of participation in the ad network, or a combination of these with other factors. In some cases, various different types of designations may be employed (e.g., bronze, silver, gold, and platinum) to indicate a merchant's trust level. Furthermore, the escrow service provided by the ad network may be applicable only to certain levels of trust (e.g., only for "bronze" and "silver" merchants).

The use of two codes allowing the ad system to self-regulate and accept deal information from merchants that are not pre-qualified by the ad system (i.e., that the ad system hasn't manually screened or vetted). This process allows greater scalability of the ad system. The use of the two transaction codes allows consumers to indicate when they are satisfied that the merchant has fulfilled their side of the transaction, preventing merchants from obtaining revenue for unredeemed transactions.

As described above, various embodiments of systems, methods, and computer-readable media for verifying online transactions that are consummated offline are contemplated. Exemplary embodiments are set forth below.

For example, in some embodiments, a method may include receiving, via a network at a computer system, a request from a consumer to purchase a product or service that is redeemable at a merchant. Responsive to the request, the method may include the computer system providing first and second coupon codes to the consumer. The method may also include the computer system providing the first coupon code but not the second coupon code to the merchant, where the first coupon code is usable by the merchant to verify that the consumer has purchased the product or service, and where the second coupon code is usable by the merchant upon receipt from the consumer to provide to the computer system to verify redemption of the product or service. After receiving the second coupon code from the merchant via the network, the method may further include the computer system storing an indication that the consumer has redeemed the product or service from the merchant. The method may also include storing an indication of revenue to be allocated to an advertising service from the purchase of the product or service, and the computer system may implement an advertising service that is distinct from the merchant.

In other embodiments, a method may include sending a request to a deal system via a network to purchase a product or service and, responsive to the request, receiving first and second coupon codes from the deal system via the network, where the first coupon code is also received by the merchant from the deal system and is usable by the merchant to verify that the consumer has purchased the product or service, and where the second coupon code is unique to the consumer and is not received from the deal system by the merchant. The method may also include providing the first and second coupon codes to the merchant upon redeeming the product or service from the merchant, where the first and second coupon codes are usable by the merchant to receive payment for the purchase from the deal system. In some cases, the deal system may be implemented by a website comprising one or more computer systems, and the first coupon code may be unique within purchases recorded by the deal system.

In yet other embodiments, a method may include, responsive to a consumer sending a request to a computer system of an advertising service to purchase a product or service from a merchant, the merchant receiving a first coupon code from the computer system, where the first coupon code is usable by the merchant to verify that the consumer has purchased the product or service. The method may also include providing a second coupon code to the computer system, where the second coupon code is sent from the computer system to the consumer and is received by the merchant from the consumer only upon redemption of the product or service. In some cases, the method may further include receiving, from the advertising service, an indication of the share of revenue from the purchase of the product or service. The method may also include submitting deal information to the computer system that permits dissemination of a deal for the purchase via a wide-area network. For example, the wide-area network may include the Internet and/or a mobile telephone network.

In further embodiments, a method performed by a deal system having one or more computer systems coupled to a network may include the deal system receiving deal information from a merchant via a network, where the deal information describes a deal offered by the merchant for a product or service, and where the deal system is operated by an entity distinct from the merchant. The method may also include the deal system causing information describing the deal to be disseminated, and the deal system receiving, via the network, a request from a consumer to pre-purchase the deal based on the disseminated coupon. The method may further include, responsive to the consumer request, generating a first redemption code and a second redemption code, where the deal system provides access to the first redemption code to both the consumer and the merchant, the first redemption code facilitates the merchant verifying that the consumer has purchased the product or service, the deal system provides access to the second redemption code to the consumer but not the merchant, and the second redemption code is usable to provide to the merchant upon redeeming the product or service. Upon receiving the second redemption code from the merchant, the method may also include storing an indication that the consumer has redeemed the product or service from the merchant.

The embodiments described above may be combined in any suitable manner. Furthermore, non-transitory computer-readable memory media that include program instructions executable to implement any of the methods described in this section are also contemplated. Additionally, computer systems or computing devices that are configured to implement any of the disclosed methods are also contemplated.

Publishers' Experience

In some embodiments, publisher 130 may register with the ad network via a self-service system. For example, after providing ad server 110 with its URL, ad server 110 may scrape the publisher's website and create a mock version to illustrate how ads will appear on their pages. As noted above, ads may appear as another layer that is overlaid upon the publisher's website, instead of as a unit within the site. This may, in some instances, avoid requiring that the publisher redesign its website and may also provide the network a more prominent touch point to the consumer. In other instances, ads can be displayed within designated portions of the publisher's website.

Figure 34:
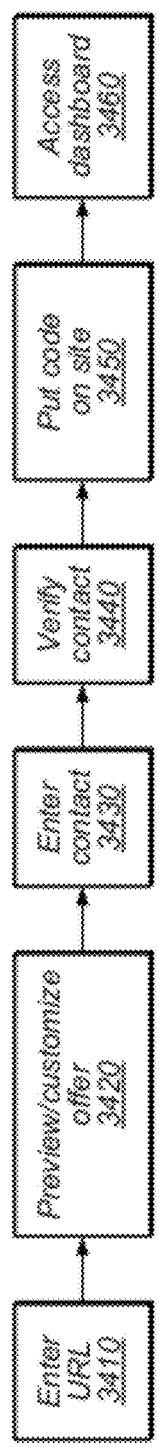
FIG. 34 is a flowchart of a method for allowing a publisher to customize and/or preview offers according to some embodiments.

Turning to FIG. 34, a flowchart of a method for allowing a publisher to customize and/or preview offers is shown according to some embodiments. At 3410, the publisher may sign onto the network by entering a URL, a password, or the like in a login page. At 3420, the publisher may then preview an available offer on its website, and may customize the manner in which the offer will appear. For example, in some embodiments, ad server 110 may provide the publisher with a tool to modify the rules, which make any given ad appear as a layer over the page, and reflect the difference in expected revenue based on the frequency and position that the ad unit appears on the site. At 3430, the publisher may provide contact information and verify an email address. Once the publisher's information has been confirmed at 3440, ad server 110 may provide to the publisher a piece of code to put on the publisher's website (e.g., into the footer of the site) at 3450, which may tell the visiting user's browser to call ad server 110 for additional code that will determine when/how to display a given ad over that page. At 3460, the publisher may be able to log into ad server 110 to view a dashboard indicating the performance of any given ad unit, including its share of revenue generated from the ad units, as well as collect payment for its services from the network. In some cases, publishers may earn revenue as a percentage of revenue from transactions on the website. In other cases, publishers may also share in revenue on other sites if they were responsible for first bringing that customer to the ad network.

FIG. 35 shows a screenshot of a panel displaying "offer previewing" functionality according to some embodiments. As illustrated, options panel 3510 allows the publisher to select a characteristic related to ad presentation. In this case, the characteristic being selected is the position of the ad relative to the length of the publisher's web page, which may be adjusted to display the ad at 25%, 50%, or 75% of the length of the page. Moreover, panel 3510 contains information that allows the publisher to evaluate certain trade-offs between ad position and monthly revenue. For example, in this case if the publisher allows the ad to be displayed at a position 25% into web page 3530 (i.e., near the top of the page and with more consumer visibility) it will receive more revenue than if the ad is displayed 50% or 75% into the web page 3530 (i.e., lower into the page and with less consumer visibility). In response to the publisher's selection in panel 3510, ad 3520 is rendered at a corresponding position within web page 3530.

In some embodiments, the publisher may establish certain rules with respect to the presentation of ads to its visitors. For example, rules for displaying ads may include how long into the user's visit to present the ad, how often has the user visited the site, is the user signed in/out, which page the user is viewing, what search the user ran to get to that page, whether the user already signed into the ad network—e.g., via FACEBOOK CONNECT or some other suitable mechanism. In some cases, the publisher may also select certain types of ads that may be layered over its pages, their source, and/or price range. As an example, the publisher may establish rules such that ads are not shown until a user is at least 30 seconds into its visit, and that at most one ad be shown every three days to the same user. Such rules may be stored, for example, as URL rules data entry 220 within sub-module 310 of FIG. 3.

Merchants' Experience

Overview

In some embodiments, a merchant or advertiser may be able to sign up for the ad network using a self-service web tool. The self-service tool enables a merchant to create an offer that includes, for example, an original price, a discounted price, the duration of the offer, and other offer details. The merchant may also specify how much they want to share with the publisher as a percentage of revenue. In some cases, the merchant does not pay the ad network to place ads, but instead the merchant may adjust the percentage they take from the consummation of a deal generated through the ad. In other cases, some merchants may sign up for preferred status through a membership agreement that includes a periodic fee assessed by the network.

Generally speaking, the amount of revenue that a merchant is willing to share with a publisher may factor into the expected revenue to that publisher. This revenue multiplied by the number of times a consumer is expected to purchase the item or service, represents the total expected revenue to a publisher. Accordingly, in some embodiments the ad network may dynamically rank offers based on the highest expected revenue to the ad system. For sake of illustration, consider a first offer for $200 of services priced at $180 to a consumer, where the merchant is willing to share 10% with the publisher, or $18. Now consider a second offer for $20 of services priced at $10 sharing 50% with the publisher, or $5. The second offer may generate a larger number of completed transactions, but unless it can generate at least 4 times as many transactions, the first offer may be shown more frequently.

Merchants may also be able to target deals based on demographics, influence within a network measured by online connections, time until the item expires (for instance a baseball game), general price sensitivity, etc. Moreover, in some cases the importance of these factors may be automated by the ad network.

Figure 36:
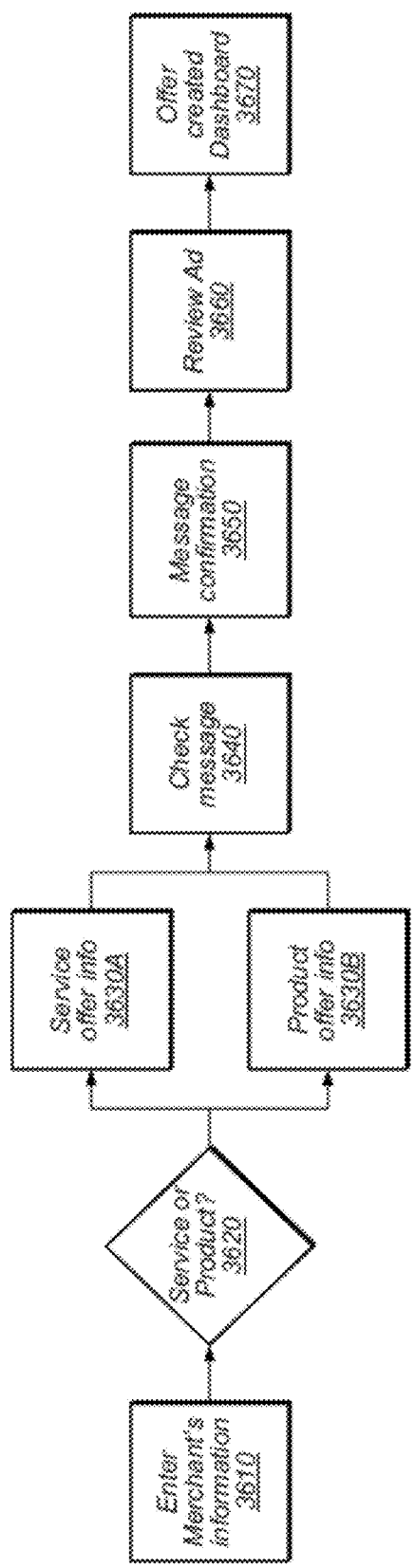
FIG. 36 is a flowchart of a method for allowing a merchant to make offers according to some embodiments.
Figure 37:
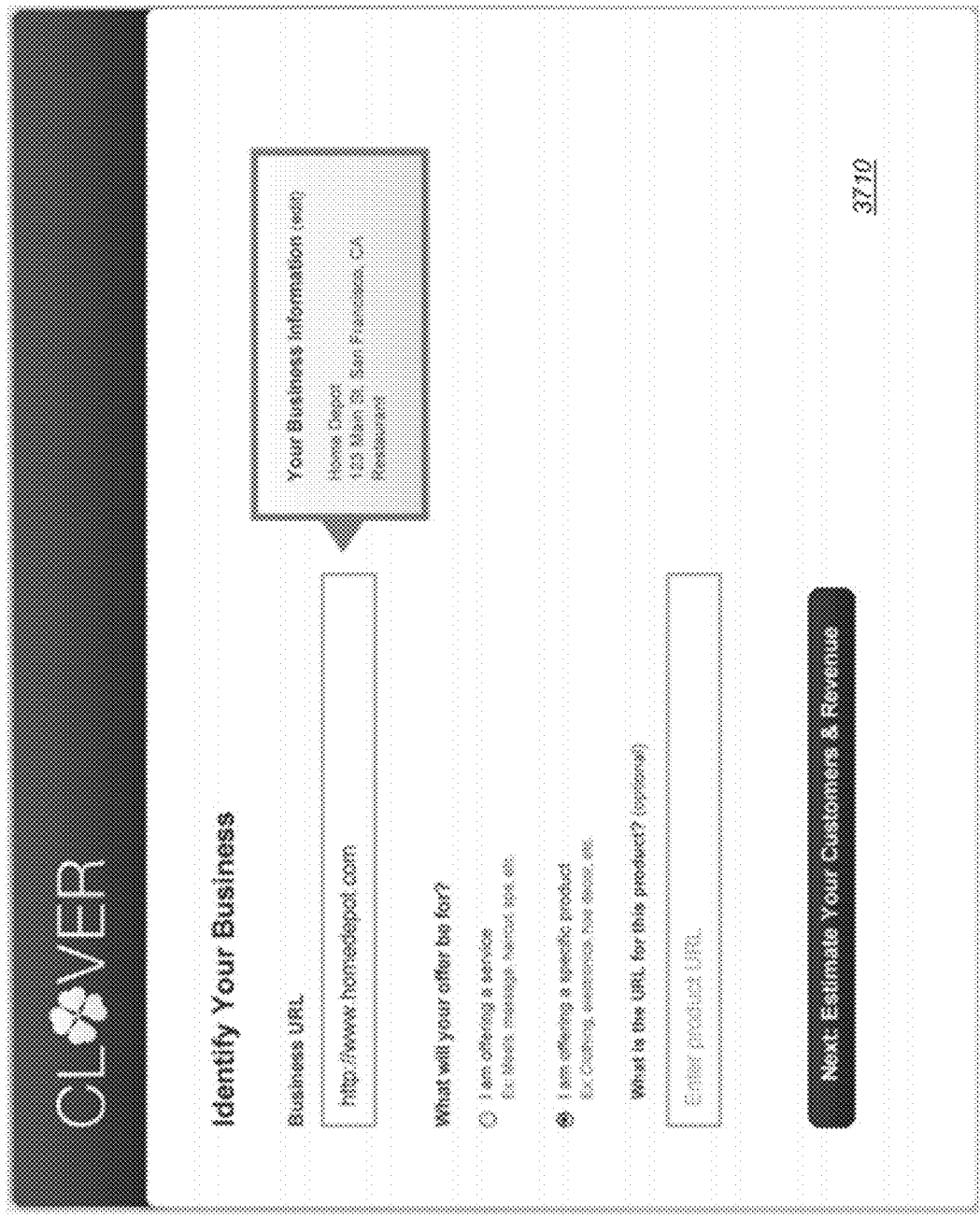
FIG. 37 is a screenshot of merchant offer page according to some embodiments.
Figure 38:
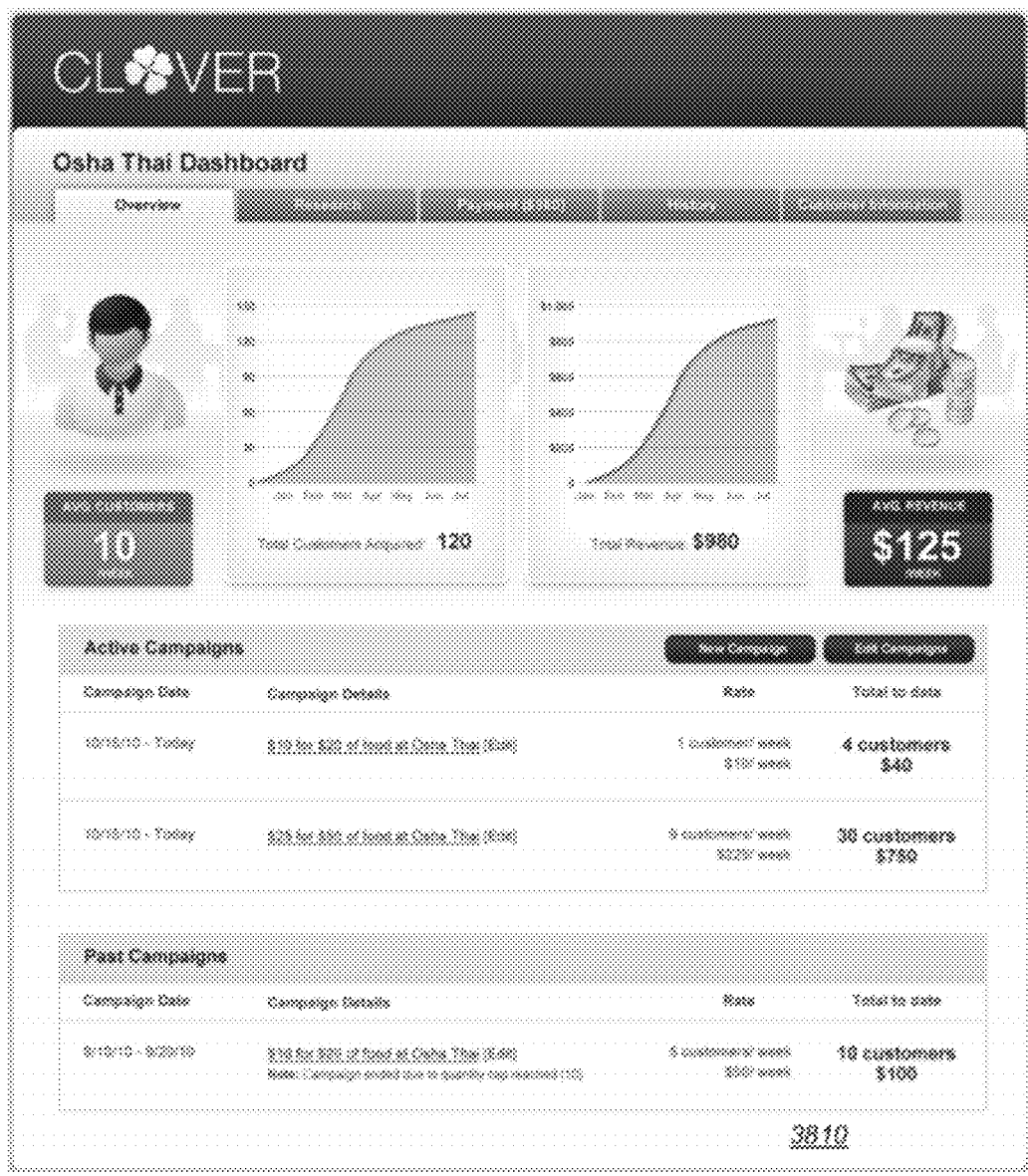
FIG. 38 is a screenshot of merchant dashboard according to some embodiments.

Referring to FIG. 36, a flowchart of a method for allowing a merchant to make offers is shown according to some embodiments. At 3610, the merchant may sign onto the network by entering a URL, a password, or the like in a login page. Then, the merchant may indicate whether it has a product or service to offer at 3620 and may enter details related to the service or product at 3630A and 3630B, respectively. A screenshot of a merchant offer page is shown in FIG. 37. At 3640 and 3650, the offer may then be subject to an email confirmation from the merchant (e.g., to avoid fraud, etc.), and the offer may be reviewed and created at 3660. Accordingly, at 3670 the merchant may be provided access to a webpage or dashboard 3810 such as the one depicted in FIG. 38, which may include functionality that allows the merchant to collect various analytical data regarding its activities in the network (e.g., number of customers acquired per ad campaign, total and average revenue, etc.).

Figure 39:
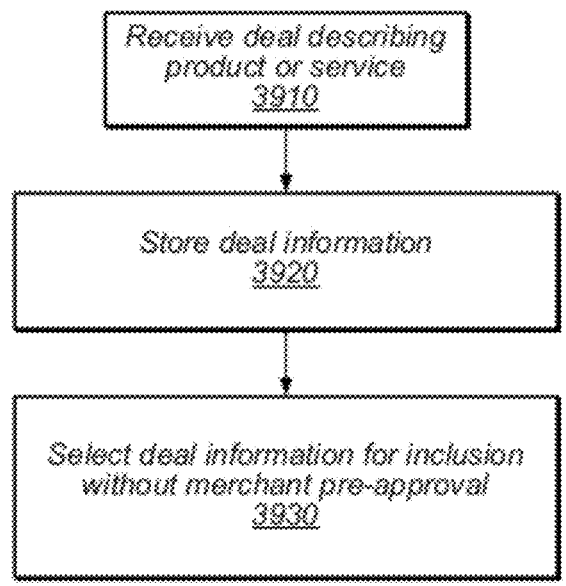
FIG. 39 is a flowchart of a method for disseminating deals from merchants that are not pre-approved is depicted according to some embodiments

In addition to the foregoing, systems and methods described herein may allow a merchant to include ads for presentation by publisher sites without pre-approval. Turning to FIG. 39, a flow chart of a method for disseminating deals from merchants that are not pre-approved is depicted according to some embodiments. At 3910, the method receives a deal describing a product or service at a computer system of an advertising service. At 3920, the method stores the received deal information at the computer system. And at 3930, the advertising computer system selects the stored deal information for inclusion in an advertisement disseminated to users of the advertising service, where the deal information is selected without the merchant being pre-approved by the advertising service. For example, a mechanism such as the one described above with respect to the verification of online transactions that are consummated offline may be employed to enable the ad network to function as an escrow service and allow the merchant to bypass an approval process. In some cases, the method of FIG. 39 may further include receiving, at the computer system, feedback from users of the advertising service regarding the merchant, and the advertising service changing future selection of deal information for the merchant for inclusion in advertisements based on the feedback.

Decaying Price Alerts

In some embodiments, an advertiser or merchant may wish to place services or goods on the ad network whose market value is expected to diminish over time. For instance, as the time of an event approaches, the value of the offer concerning that event approaches zero. In fact, after the event takes place, the value of the offer is typically zero. Examples of such services or goods include tickets to a sporting event, reservations to a restaurant or hotel at a specified time or date, etc. In these situations, the merchant may be allowed to set rules (or enable the ad network system to set the rules) around the starting price and lowest price as well as the duration of the offer. The offer may then be presented to users and its price may fall following the rules if no one accepts the offer. The ad network service may push the offer to potential consumers via internet and mobile services. If the consumer purchases the good or service, the inventory may be removed from the ad network system. Additionally or alternatively, in an auction scenario, once a consumer has placed a bid for the item (perhaps after the rules have caused the price of the item to be reduced at least once), the rules may allow the auction to continue with increasing bids.

Figure 40:
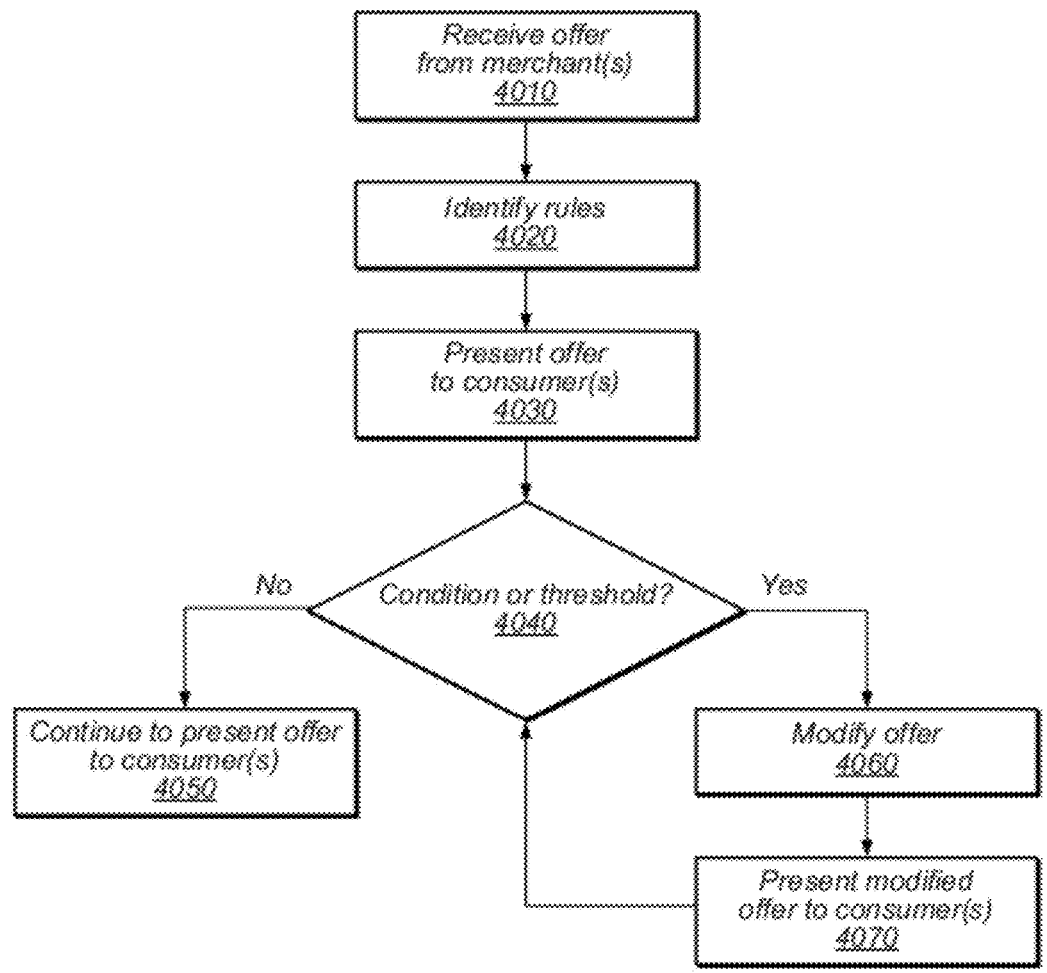
FIG. 40 is a flowchart of a method for pushing alerts of decaying pricing for a time sensitive prepaid service or good according to some embodiments.

Referring to FIG. 40, a flowchart of a method for pushing alerts of decaying pricing for a time sensitive prepaid service or good is depicted according to some embodiments. At 4010, the method may receive an offer from a merchant or advertiser. At 4020, the method may receive rules for changing one or more aspects of the offer. For example, ad server 110 may provide the merchant with a dashboard that allows the merchant to set price decaying (or increasing) rules over time, change the number of items included in the offer over time, add different items to the offer, etc. The method may then present the offer to one or more consumers at 4030. At 4040, the method may determine whether an offer-changing event has occurred. For example, a certain amount of time may have passed, etc. If so, the offer may be modified according to the merchant's rules at 4060 and the modified offer may then be presented to consumers at 4070. Otherwise, the method may continue to present the original offer to consumers at 4050. A shown, block 4070 is connected to block 4040 to illustrate that the rules identified at 4020 may be such that one or more aspects of the offer may change incrementally, periodically, continually, and/or upon the occurrence of a plurality of events, conditions, or thresholds.

As described above, various embodiments of systems, methods, and computer-readable media for decaying price alerts are contemplated. Exemplary embodiments are set forth below.

For example, in some embodiments, a method may include receiving, via a network at a computer system, an original offer for an item from a merchant, where the original offer includes a parameter. The method may also include allowing the merchant to set, via the network, a rule configured to cause the parameter to change in response to an occurrence of a condition. The method may further include making the original offer available for publishing via the network and identifying, by the computer system, an indication of the occurrence of the condition. The method may then include modifying, by the computer system, the original offer into a modified offer by changing the parameter according to the rule and making the modified offer available for publishing via the network. In some cases, the parameter may be a price of the item and/or the condition may be an elapsed time.

In other embodiments, a method may include providing, to a computer system via a network, an offer for an item from a merchant, where the offer includes a parameter. The method may also include receiving, from the computer system via the network, code that enables the merchant to set a rule configured to cause the parameter to change in response to an occurrence of a condition and setting the rule. Again, in some cases, the parameter may be a price of the item and/or the condition may be an elapsed time. In further embodiments, a method may include a computer system of an advertising system receiving a decaying pricing rule from a merchant, where the decaying pricing rule is usable by the advertising system to generate a price for inclusion in an advertisement for a product or service.

The embodiments described above may be combined in any suitable manner. Furthermore, non-transitory computer-readable memory media that include program instructions executable to implement any of the methods described in this section are also contemplated. Additionally, computer systems or computing devices that are configured to implement any of the disclosed methods are also contemplated.

Auction Based on Expected Revenue

Revenue sharing between publishers, the merchant, and the ad system may be performed in a variety of different ways. In one embodiment, marketing fees spent by the merchant may be shared between a publisher and the ad system. For example, if the merchant agreed to share 20% of sales revenue (e.g., $4 of a $20 sale), the ad system and the publisher may receive an equal portion of 10% of the revenue, or $2. In some embodiments, the ad system may charge the publisher a small commission fee, which may be deducted from the publisher's portion. For example, the publisher may, in actuality, receive $1.80 for a 10% commission.

In some embodiments, an ad network service as described herein may enable merchants to use revenue sharing as a way to bid for placement on websites and mobile services. Embodiments of the ad system thus permit merchants to place bids to the ad system that specify the amount of revenue that they are willing to pay to the ad system if a transaction based on the ad is consummated. Thus, information for a particular deal may specify, in one example, the merchant, a price, a quantity, and an amount of revenue to be paid to the ad system if the deal is consummated. In an embodiment, the bids of one merchant are not visible to other merchants (a "sealed-bid auction"). Such an arrangement allows merchants to conceal their competitive activities. The present ad system allows the revenue portion of the bid to be arbitrarily complex. As an example, a bid may include a single dollar amount. In other examples, a merchant may vary its bid based on attributes of the potential customer (e.g., age, gender, income level, etc.). Thus, in some instances, a merchant may be willing to pay a higher amount of revenue to the ad system for a user with a certain attribute profile.

Figure 41:
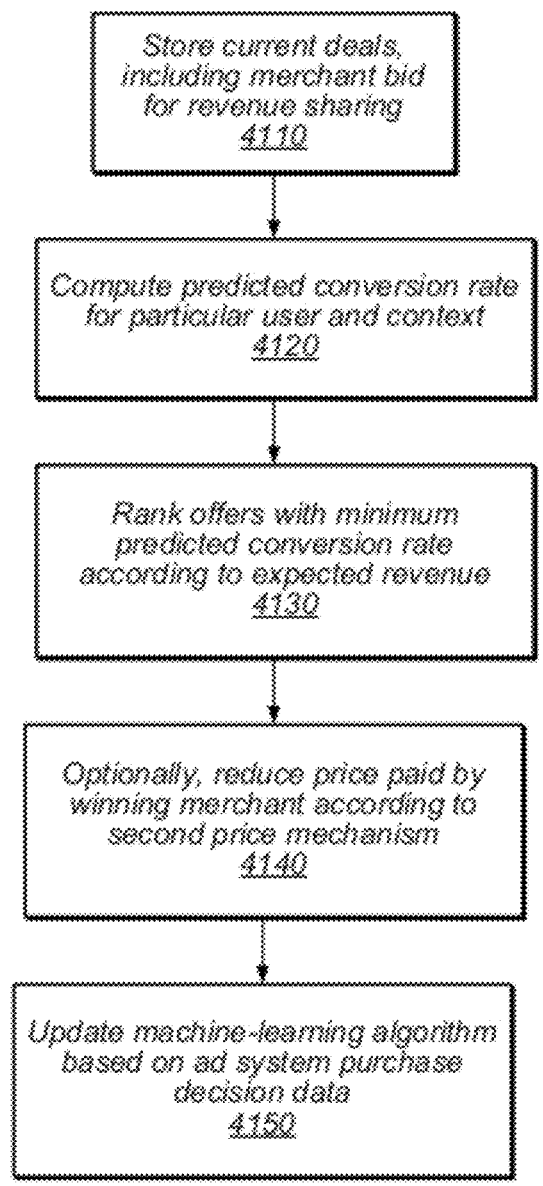
FIG. 41 is a flowchart of a method for selecting an ad for display using revenue information according to some embodiments.

Turning to FIG. 41, a flowchart of a method for selecting an ad for display using revenue information (e.g., predicted revenue) is depicted according to some embodiments. At 4120, the method may store current deals, including merchant bid for revenue sharing. At 4130, the method may compute a predicted conversion rate for a particular user in a particular context. At 4140, the method may rank offers with minimum predicted conversion rate according to expected revenue. Optionally, at 4150 the method may reduce the price paid by a winning merchant according to a second price mechanism. And at 4160, the method may update a machine learning-algorithm based on ad system purchase decision data.

Still referring to FIG. 41, assume that the ad system has made a determination to display an ad to a user of the system (e.g., some specified amount of time has elapsed since the user arrived at a publisher's web page). For this particular user and this particular context (i.e., the user's geographical location, the user's current web location (what website they are currently visiting), the time of day, etc.), the ad system sorts the current offers in descending predicted revenue order. In one implementation, the ad system sorts only those current offers that exceed some minimum predicted conversion rate (e.g., 3%); accordingly, an offer with a high predicted revenue will not be considered for selection if it has a very low likelihood of resulting in a consummated transaction.

In some embodiments, the predicted conversion rate for a particular user and context is performed by a system that may employ machine-learning techniques, while the predicted revenue for a particular user and context is the predicted conversion rate multiplied by the merchant's bid for that user and context. In an embodiment, the prediction of conversion rate is performed by a machine-learning system that is trained using historical purchase data available to the ad system. The training set contains instances of purchase/no purchase decisions and many data points about the (user, context, offer). For example, the training examples might contain the following data points about the offer that was made to a user: price of offer, % discount of offer, popularity of merchant, time of day, gender of user, income of user, interests of user, websites visited by user, categories of websites visited by user, search queries by user, category of business, number of friends that had purchased the offer, "closeness" of friends that had purchased the offer, physical distance between the user's home and the business, physical distance between the user's workplace and the business, the "cluster id" of the user (generated by a clustering algorithm that placed, and users into clusters based on similar attributes of preferences).

The system, given a particular (user, context, offer), may be configured to generate a predicted conversion rate (e.g., a number between 0 and 1 that represents the percentage likelihood that a purchase will result from the ad). In some embodiments, the predicted conversion rate is based on a score computed according to a number of preselected attributes. For sake of illustration, consider the following example offers for a particular user at a particular location at a particular time:

TABLE I

Offer from ABC Pizza
Offer #1: 50% off at ABC Pizza

| Attribute | Value | Score |
|---|---|---|
| Distance | 0.3 miles | +10 |
| Category | Pizza | −1 |
| Discount Amount | 50% | +4 |
| Friends | Leonard checked in at ABC Pizza via Social Media Service | +2 |
| Day of the Week | Saturday | −3 |
| Customer Service or Website Rating | 3/5 | −2 |
| | Total Score | 10 |
| | Conversion Rate | 50% |

TABLE II

Offer from Soup Kitchen
Offer #2: 10% off at Soup Kitchen

| Attribute | Value | Score |
|---|---|---|
| Distance | 1 miles | +1 |
| Category | Food > Health | +10 |
| Discount Amount | 10% | −1 |
| Friends | Kevin recently purchased deal | +5 |
| Day of the Week | Monday | +2 |
| Customer Service or Website Rating | 1/5 | −10 |
| | Total Score | 7 |
| | Conversion Rate | 30% |

In the examples above, a composite score is determined from the sum of a number of different attribute scores (e.g., distance, type of product/service, discount amount, friend interest, day of week, customer service rating). Any suitable algorithm can be used to compute a composite score. Attribute scores can have non-linear values in some implementations (e.g., a distance of <0.5 mile could have an attribute score of +10, while a distance of 1.0 mile could have an attribute score of +4, and a distance of 3.0 miles a 0). Similarly, certain attribute scores can be weighted more heavily than other attribute scores if they are considered more important in determining the composite score.

In an embodiment, the predicted conversion rate is computed from the composite score. In certain implementations, there may be a pre-set mapping between composite scores and predicted conversion rates (e.g., a composite score of +10 corresponds to a conversion rate or purchase percentage of 30%). In other implementations, the mapping between composite scores and conversion rates can be continually or periodically updated. Alternatively, the predicted conversion rate can be computed from the composite score based on any suitable formula or function involving additional variables or inputs.

Using the predicted conversion rate for a particular user and context, the predicted revenue to the ad system for a given offer may be calculated by multiplying the predicted conversion rate by the amount of revenue the merchant is willing to pay to the ad system if a transaction is consummated (as specified in the merchant's bid). Continuing with the example offers listed above, the following expected revenues values result:

Offer #1: Conversion Rate: 50%; Merchant Bid: $10. Expected Revenue=$5.

Offer #2: Conversion Rate: 30%; Merchant Bid: $15. Expected Revenue=$4.50.

In some embodiments, Offer #1 will be shown before Offer #2 because Offer #1 has a higher expected revenue to the ad system (although Offer #2 may still be shown to the user).

In certain embodiments, it may be desirable to encourage the merchants to not be afraid of bidding too high (and thus paying the ad system too much money). Accordingly, in some instances, the winning bid may be reduced so that the merchant pays less than its actual bid. For example, the winning bid may be reduced based on the amount of revenue specified in the second-place bid. In one implementation, the price paid is reduced by the percentage difference between the highest predicted revenue (the winning offer) and the second-highest predicted revenue (the runner-up offer). Using the example above, ABC Pizza's price would be reduced as follows (assuming consummation):

$10(original bid)−$10*(($5−$4.50)/$5)=$9(amount actually owed to ad system).

ABC Pizza would thus pay 10% under their original bid of $10, making this a "second price" auction. Various other alternatives of this scheme are possible; for example, the winning merchant may pay only a certain increment above the next-highest bid.

Suppose, however, that the ABC Pizza advertisement is shown first, and then the Soup Kitchen deal is displayed. If the consumer actually selects the Soup Kitchen ad, in some embodiments, this purchase decision represents another data point that can be used to update future personalization decisions made by the ad system. Thus, for example, in the future, more weight may be given to characteristics that are similar to other deals the consumer has provided feedback on, or by asking the consumer outright what aspect of the deal made him or her consummate the transaction. In this case, if it was the "healthy food" aspect of Soup Kitchen that led to deal consummation, future personalization decisions for that user can give greater weight to that category in determining expected conversion rate (thus Food>Health might get +20 points in the future). Future personalization decisions for other consumers linked to that consumer (e.g., that are friends of that user) may be similarly influenced.

In sum, in an embodiment, an ad for a prepaid service or goods may be shown more frequently if the expected total transaction value (e.g., amount of revenue being shared multiplied by the predicted conversion rate) exceeds that of the next best offer. When the expected revenue share falls, ad server 110 may automatically pick the new highest winning bid. This paradigm is in contrast with other systems that allow advertisers to bid for cost-per-click or impression; here, the ad network system allows merchants to conduct sealed bids for revenue sharing of consummated transactions. As noted above, in some embodiments, the ad network service may potentially reduce the price paid to the winning merchant, thus preventing the merchant from over-paying.

As described above, various embodiments of systems, methods, and computer-readable media for an auction based on expected revenue are contemplated. Exemplary embodiments are set forth below.

For example, in some embodiments, a method may include a computer system of an advertisement service selecting an advertisement of a merchant for display to a consumer based on predicted revenue from the merchant to the advertisement service for the advertisement. For example, the advertisement may be for a product or service of the merchant, and may be selected from a plurality of offers received by the computer system, where the selected offer specifies an amount of revenue to be paid to the advertisement service if a transaction based on the advertisement is consummated. In some cases, selecting the advertisement may include ranking those ones of the plurality of offers that are above a minimum predicted conversion rate, where the ranked offers are ranked according to predicted revenue to the advertisement service, and selecting the highest-ranked offer to display to the consumer.

In certain embodiments, a method may also include computing, for the consumer, a predicted conversion rate for each of the plurality of offers. For example, the predicted conversion rate for a given one of the plurality of offers may be computed from a composite score based on a plurality of attribute scores. Additionally or alternatively, the predicted conversion rate may be computed for each offer according to a current context of the consumer. In some cases, the current context of the consumer may be based at least in part on a current physical location of the consumer, a current time of day, a current day of the week, etc. In other cases, the plurality of attribute scores for a given offer may include an attribute score based on distance between the consumer and a merchant corresponding to the given offer, a user preference for a type of merchant, preferences of other consumers linked to the consumer via an information sharing service, an amount of discount specified by the offer, a customer service rating of a merchant corresponding to the given offer, etc.

A method may further include reducing an amount of revenue to be paid to the advertisement service by the merchant corresponding to the selected offer, where the amount of revenue for the selected offer is reduced based on an amount of revenue specified by a next-highest offer of the plurality of offers. Additionally or alternatively, the amount of revenue for the selected offer may be reduced based on the percentage difference the amount of revenue specified by the selected offer and the amount of revenue specified by a next-highest offer of the plurality of offers.

In other embodiments, a method may include a computer system storing a plurality of offers from merchants, and the computer system computing, for a particular consumer, an expected conversion rate for ones of the plurality of offers. In some cases, the expected conversion rates may be computed for a current context of the particular consumer. For example, the current context of the consumer may be based at least in part on a current site being visited by the particular consumer. Additionally or alternatively, the expected conversion rate for the particular consumer for a given one of the plurality of offers may be computed from a composite score based on a plurality of attribute scores.

In yet other embodiments, a method may include a computer system receiving an offer from a merchant that specifies an amount of revenue to be paid to an advertising service if a transaction based on the offer is consummated.

In some embodiments, a method may include a computer system conducting an auction for advertisement placement, where the auction is based on merchant bids that specify an amount of revenue to be paid to an advertising service if corresponding transactions are consummated. In some cases, a first merchant bid may specify different levels of revenue sharing for different consumer profiles. The method may further include determining a winning bid and a second-place bid of the auction according to expected revenue and reducing an amount of revenue paid by a merchant of the winning bid, where the amount of revenue is reduced based on an amount of revenue specified by a merchant of the second-place bid. For example, the plurality of attribute scores may be assigned based on information representative of historical purchase/no-purchase decisions made by users of the advertisement service.

A method may also include updating the information representative of historical purchase/no-purchase decisions made by users of the advertisement service, where the updated information is usable to change future computation of attribute scores for offers being considered for presentation to the consumer. Additionally or alternatively, the method may include updating the information representative of historical purchase/no-purchase decisions made by users of the advertisement service, where the updated information is usable to change future computation of attribute scores for offers being considered for presentation to the consumer and to other users of the advertisement service. In some cases, the predicted conversion rate may be computed according to a machine-learning algorithm based, at least in part, on a current set of purchase decision data for users of the advertisement service. The method may further include updating the current set of purchase decision data after a consummated transaction and/or after receiving a user indication of no interest in a particular offer.

In other embodiments, a method may include a deal system storing information for a plurality of deals offered by merchants and the deal system storing and/or computing information indicative of a conversion rate for one or more of the plurality of deals. The method also may include the deal system selecting one of the plurality of deals for inclusion in a web page advertisement, where the selecting may include eliminating those deals having a conversion rate below a conversion rate threshold. In some cases, the conversion rate for a given deal indicates a percentage of advertisements displayed for the given deal that result in a purchase, where the conversion rate threshold is specified by the deal system. Further, the stored information for a first of the plurality of deals may specify a merchant, a product or service, and/or a price.

In yet other embodiments, a method may include a deal system storing information for a plurality of deals offered by merchants and the deal system storing information indicative of expected revenue to the deal system for one or more of the plurality of deals. The method also may include the deal system selecting one of the plurality of deals for inclusion in an advertisement according to expected revenue to the deal system. In some cases, the selected deal may be selected as having the highest expected revenue to the deal system relative to the other stored deals. Also, the selected deal may be selected based, at least in part, on having an expected revenue to the deal system that is above a minimum expected revenue.

In still further embodiments, a method may include a deal system storing information for a plurality of deals offered by merchants and the deal system computing information indicative of expected revenue to the deal system for one or more of the plurality of deals. The method may also include the deal system selecting one of the plurality of deals for inclusion in an advertisement according to expected revenue to the deal system.

The embodiments described above may be combined in any suitable manner. Furthermore, non-transitory computer-readable memory media that include program instructions executable to implement any of the methods described in this section are also contemplated. Additionally, computer systems or computing devices that are configured to implement any of the disclosed methods are also contemplated.

An Exemplary Computer System

In some embodiments, one or more of the various methods or techniques described in any of the previous sections may be implemented as program instructions and/or data capable of being stored or conveyed via an article of manufacture including a computer-readable or -accessible medium. As such, one or more non-transitory computer-readable memory media that include program instructions executable to implement any of the preceding methods. In other embodiments, a computer system may include one or more processors and memory storing program instructions executable to implement any of the preceding methods. The program instructions may be implemented in various embodiments using any desired programming language, scripting language, or combination of programming languages and/or scripting languages—e.g., C, C++, C#, Java™, JavaScript™, Perl, etc.

Figure 42:
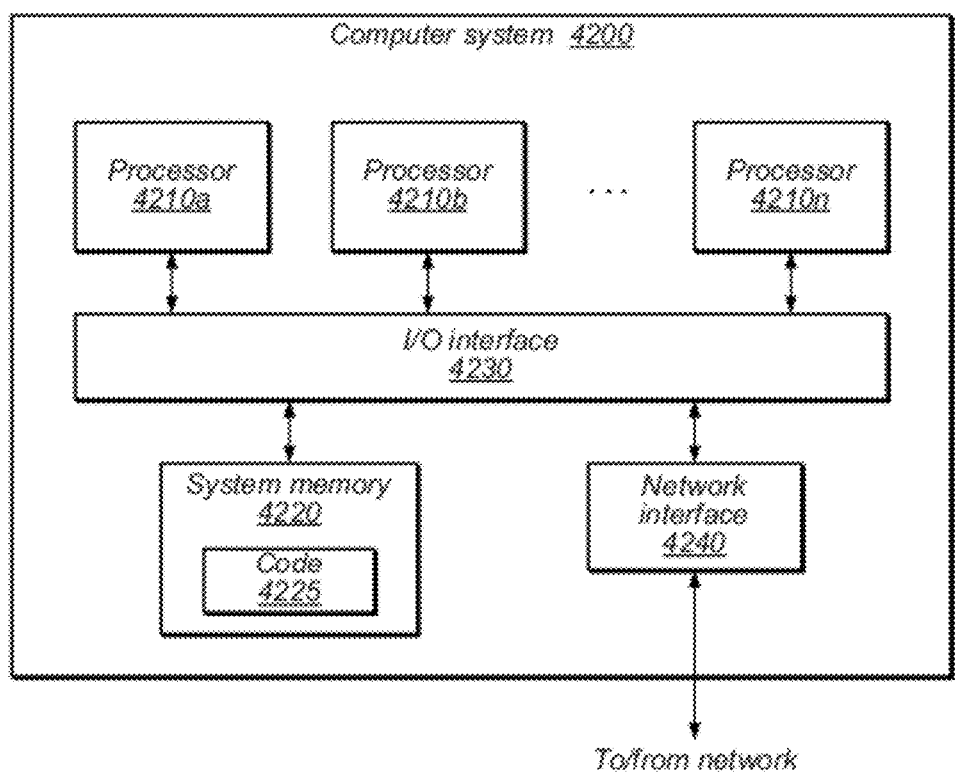
FIG. 42 is block diagram of a computer system configured to implement systems and methods disclosed herein according to some embodiments.

An embodiment of a computer system including computer-accessible media is shown in FIG. 42. As illustrated, computer system 4200 includes one or more processors 4210 coupled to a system memory 4220 via an input/output (I/O) interface 4230. Computer system 4200 further includes a network interface 4240 coupled to I/O interface 4230. In some embodiments, ad server 110 may be implemented using a single instance of computer system 4200, while in other embodiments multiple such systems may be configured to host different portions or instances of an ad server (e.g., element 110). Moreover, in some embodiments, some data sources or services may be implemented via instances of computer system 4200 that are distinct from those instances implementing other data sources or services.

In various embodiments computer system 4200 may be a single processor system including one processor 4210, or a multiprocessor system including several processors 4210 (e.g., two, four, eight, or another suitable number). Processors 4210 may be any suitable processor capable of executing instructions. For example, in various embodiments processors 4210 may be a general-purpose or embedded processor implementing any of a variety of instruction set architectures (ISAs), such as the x426, PowerPC, SPARC, or MIPS ISAs, or any other suitable ISA. In multiprocessor systems, each of processors 4210 may commonly, but not necessarily, implement the same ISA. System memory 4220 may be configured to store instructions and data accessible by process 4210. In various embodiments, system memory 4220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 4220 as code 4225.

In an embodiment, I/O interface 4230 may be configured to coordinate I/O traffic between processor 4210, system memory 4220, and any peripheral devices in the device, including network interface 4240 or other peripheral interfaces. In some embodiments, I/O interface 4230 may perform any necessary protocol, timing or other data transformations to convert data signals from one component (e.g., system memory 4220) into a format suitable for use by another component (e.g., processor 4210). In some embodiments, I/O interface 4230 may include support for devices attached through various types of peripheral buses, such as a variant of the Peripheral Component Interconnect (PCI) bus standard or the Universal Serial Bus (USB) standard, for example. In some embodiments, the function of I/O interface 4230 may be split into two or more separate components, such as a north bridge and a south bridge, for example. Also, in some embodiments some or all of the functionality of I/O interface 4230, such as an interface to system memory 4220, may be incorporated directly into processor 4210.

Network interface 4240 may be configured to allow data to be exchanged between computer system 4200 and other devices attached to a network, such as other computer systems, for example. In various embodiments, network interface 4240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol. In some embodiments, system memory 4220 may be an embodiment of a computer-accessible medium configured to store program instructions and data as described above. However, in other embodiments, program instructions and/or data may be received, sent or stored upon different types of computer-accessible media.

Generally speaking, a computer-accessible medium may include storage media or memory media such as magnetic or optical media, e.g., disk or CD/DVD-ROM coupled to computer system 4200 via I/O interface 4230. A computer-accessible medium may also include any volatile or non-volatile media such as RAM (e.g., SDRAM, DDR SDRAM, RDRAM, SRAM, etc.), ROM, etc, that may be included in some embodiments of computer system 4200 as system memory 4220 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 4240.

The various methods as illustrated in the figures and described herein represent example embodiments only. The methods may be implemented in software, hardware, or a combination thereof. The order of these methods may be changed, and various elements may be added, reordered, combined, omitted, modified, etc. Various modifications and changes may be made by a person of ordinary skill in the art having the benefit of this specification. It is intended that the specification embrace all such modifications and changes and, accordingly, the above description to be regarded in an illustrative rather than a restrictive sense.

The invention claimed is:

1. A method, comprising:
   storing, by a computer system, information indicative of a bid from a merchant device;
   retrieving, by the computer system, a plurality of bids, wherein the plurality of bids comprises the bid from the merchant device, and wherein each of the plurality of bids comprises a respective offer for a percentage of sales revenues from consummated transactions that originated from displaying a first advertisement corresponding to a respective bid of the plurality of bids;
   computing, by the computer system, a respective predicted conversion rate corresponding to each of the plurality of bids, wherein the respective predicted conversion rate is associated with a consumer device and a composite score of at least one pre-selected attribute, wherein the composite score is determined through a sum of values associated with each of the at least one pre-selected attributes;
   computing, by the computer system, a respective predicted revenue of each of the plurality of bids, wherein the respective predicted revenue is based at least in part on the respective predicted conversion rate and the respective offer of each of the plurality of bids;
   ranking, by the computer system, the plurality of bids using the respective predicted revenue of each of the plurality of bids;
   selecting, by the computer system, a second advertisement to display at the consumer device, based at least in part on the ranking, wherein the second advertisement is associated with a selected bid of the plurality of bids;
   receiving, by the computer system, one or more characteristics related to presenting the second advertisement in a web page at a web browser of the consumer device;
   displaying, by the computer system, based at least in part on the one or more characteristics, the second advertisement and a selectable visually perceptible element in a first layer overlaid upon the web page, the selectable visually perceptible element representative of a request for a product associated with the second advertisement;
   receiving, by the computer system, an indication of selection of the selectable visually perceptible element;
   displaying, by the computer system, a plurality of selectable visually perceptible elements in a second layer overlaid upon the web page, at least one of the plurality of selectable visually perceptible elements permits the consumer device to complete a purchase of the product without redirection to a different web page; and
   displaying, by the computer system, a second selectable visually perceptible element in a third layer overlaid upon the web page, the second selectable visually perceptible element permits the consumer device to share the second advertisement, wherein the second advertisement is available to a recipient of the share for a predetermined period of time.

2. The method of claim 1, wherein the respective predicted revenue of each of the plurality of bids is determined by multiplying the respective predicted conversion rate corresponding to each of the plurality of bids and the respective offer of each of the plurality of bids.

3. The method of claim 2, wherein selecting the second advertisement further comprises:
   identifying a sub-set of bids from the plurality of bids, wherein each of the sub-set of bids is greater than a threshold; and
   selecting the advertisement corresponding to a bid with a highest associated predicted revenue.

4. The method of claim 1, wherein the respective predicted conversion rate corresponding to each of the plurality of bids is computed based at least in part on a current physical location of the consumer device.

5. The method of claim 1, wherein the respective predicted conversion rate corresponding to each of the plurality of bids is computed based at least in part on a current time of day or a current day of the week.

6. The method of claim 1, wherein the respective predicted conversion rate corresponding to each of the plurality of bids is computed based at least in part on distance between the consumer device and a respective merchant device corresponding to a respective bid of the plurality of bids.

7. The method of claim 1, wherein the respective predicted conversion rate corresponding to each of the plurality of bids is computed based at least in part on a user preference for a type of merchant.

8. The method of claim 1, wherein the respective predicted conversion rate corresponding to each of the plurality of bids is computed based at least in part on preferences of a second consumer device linked to the consumer device via a third-party information sharing service.

9. The method of claim 1, wherein the respective predicted conversion rate corresponding to each of the plurality of bids is computed based at least in part on an amount of discount specified by a respective bid of the plurality of bids.

10. The method of claim 1, wherein the respective predicted conversion rate corresponding to each of the plurality of bids is computed based at least in part on a customer service rating of a merchant corresponding to a respective bid of the plurality of bids.

11. The method of claim 1, wherein selecting the second advertisement comprises identifying a second bid from the plurality of bids having a highest predicted revenue, the method further comprising:
    computing a defined amount of revenue to be shared by the merchant device with an advertisement service, wherein the defined amount of revenue is less than the predicted revenue associated with the second advertisement.

12. The method of claim 11, further comprising reducing the defined amount of revenue based at least in part on information in a third bid of the plurality of bids having a next-highest predicted revenue.

13. A non-transitory computer-readable medium storing program instructions that are executable by a computer system to:
    determine a respective predicted conversion rate corresponding to each of a plurality of bids, wherein the respective predicted conversion rate is associated with a consumer device and a composite score of at least one pre-selected attribute, wherein the composite score is determined through a sum of values associated with each of the at least one pre-selected attributes, and wherein each of the plurality of bids comprises a respective offer for a percentage of sales revenues from consummated transactions that originated from displaying a first advertisement corresponding to a respective bid of the plurality of bids;
    determine a respective predicted revenue of each of the plurality of bids, wherein the respective predicted revenue is based at least in part on the respective predicted conversion rate and the respective offer of each of the plurality of bids;

determine a ranking of the plurality of bids using the respective predicted revenue associated with each of the plurality of bids;

select a second advertisement to be displayed at the consumer device based at least in part on the ranking, the advertisement associated with a selected bid of the plurality of bids;

receive one or more characteristics related to presenting the second advertisement in a web page at a web browser of the consumer device;

display, based at least in part on the one or more characteristics, the second advertisement and a selectable visually perceptible element in a first layer overlaid upon the web page, wherein the selectable visually perceptible element representative of a request for a product associated with the second advertisement;

receive an indication of selection of the selectable visually perceptible element;

display a plurality of selectable visually perceptible elements in a second layer overlaid upon the web page, at least one of the plurality of selectable visually perceptible elements permits the consumer device to complete a purchase of the product without redirection to a different web page; and display a second selectable visually perceptible element in a third layer overlaid upon the web page, the second selectable visually perceptible element permits the consumer device to share the second advertisement, wherein the second advertisement is available to a recipient of the share for a predetermined period of time.

14. The non-transitory computer-readable medium of claim 13, wherein the program instructions are executable to determine the respective predicted conversion rate based at least in part on information representative of historical purchase/no-purchase decisions made by users of an advertisement service.

15. The non-transitory computer-readable medium of claim 13, wherein the advertisement is selected from a plurality of advertisements stored by the computer system, and wherein the program instructions are executable to select the advertisement associated with a bid of the plurality of bids having a highest predicted revenue to display at the consumer device.

16. The non-transitory computer-readable medium of claim 15, wherein the program instructions are executable to reduce an amount of actual revenue to be shared with the advertisement service by a merchant device associated with the bid of the plurality of bids based at least in part on an amount of predicted revenue for a second advertisement of the plurality of advertisements associated with a second bid of the plurality of bids having a next-highest predicted revenue.

17. A computer system, comprising:
one or more processors;
memory storing program instructions executable by the one or more processors to:

determine a respective predicted conversion rate corresponding to each of a plurality of merchant offers, the respective predicted conversion rate associated with a consumer device and a composite score of at least one pre-selected attribute, wherein the composite score is determined through a sum of values associated with each of the at least one pre-selected attributes, wherein a first merchant offer of the plurality of merchant offers is indicative of a percentage of sales revenue from consummated transactions that originated from displaying at a consumer device a first advertisement corresponding to the first merchant offer;

determine a respective predicted revenue of each of the plurality of merchant offers, wherein the respective predicted revenue is based at least in part on the respective predicted conversion rate and the respective merchant offer of each of the plurality of merchant offers;

determine a ranking of the plurality of merchant offers using the respective predicted revenue of each of the plurality of merchant offers;

select a second advertisement corresponding to a second merchant offer of the plurality of merchant offers based at least in part on the ranking of the plurality of merchant offers;

receive one or more characteristics related to presenting the advertisement in a web page at a web browser of the consumer device;

display, based at least in part on the one or more characteristics, the second advertisement and a selectable visually perceptible element in a first layer overlaid upon the web page, the selectable visually perceptible element representative of a request for a product associated with the second advertisement;

receive an indication of selection of the selectable visually perceptible element;

display a plurality of selectable visually perceptible elements in a second layer overlaid upon the web page, at least one of the plurality of selectable visually perceptible elements permits the consumer device to complete a purchase without redirection to a different web page; and display a second selectable visually perceptible element in a third layer overlaid upon the web page, the second selectable visually perceptible element permits the consumer device to share the second advertisement, wherein the second advertisement is available to a recipient of the share for a predetermined period of time.

18. The computer system of claim 17, wherein the respective predicted revenue of each of the plurality of merchant offers is determined by multiplying the respective predicted conversion rate corresponding to each of the plurality of merchant offers and a respective merchant offer of the plurality of merchant offers.

* * * * *